US012574366B2

(12) United States Patent (10) Patent No.: US 12,574,366 B2
Bendell et al. (45) Date of Patent: Mar. 10, 2026

(54) SYSTEM AND METHOD FOR SELECTIVELY GRANTING ACCESS TO PERMITTED PORTIONS OF DATA

(71) Applicant: Shopify Inc., Ottawa (CA)

(72) Inventors: Colin Bendell, Ottawa (CA); Tobias Lütke, Elgin (CA)

(73) Assignee: Shopify Inc., Ottawa (CA)

( * ) Notice: Subject to any disclaimer, the term of this patent is extended or adjusted under 35 U.S.C. 154(b) by 50 days.

(21) Appl. No.: 18/702,553

(22) PCT Filed: Nov. 30, 2023

(86) PCT No.: PCT/CA2023/051599
§ 371 (c)(1),
(2) Date: Apr. 18, 2024

(87) PCT Pub. No.: WO2024/152102
PCT Pub. Date: Jul. 25, 2024

(65) Prior Publication Data
US 2025/0158979 A1 May 15, 2025

Related U.S. Application Data

(60) Provisional application No. 63/480,803, filed on Jan. 20, 2023.

(51) Int. Cl.
*H04L 9/40* (2022.01)
*G06Q 10/083* (2023.01)
(52) U.S. Cl.
CPC ..... *H04L 63/083* (2013.01); *G06Q 10/08355* (2013.01)

(58) Field of Classification Search
CPC ............ H04L 63/083; G06Q 10/08355; G06Q 10/0832; G06Q 10/0833; G06F 21/6245
See application file for complete search history.

(56) References Cited

U.S. PATENT DOCUMENTS 9,016,559 B2 * 4/2015 Gillen .............. G06K 19/06009
235/491
9,323,892 B1 4/2016 Paris, III
(Continued)

FOREIGN PATENT DOCUMENTS

CN          109658036 A      4/2019
WO     WO-2017118561 A1 *  7/2017  ......... G06F 21/6254

OTHER PUBLICATIONS

International Search Report and Written Opinion issued in related PCT application No. PCT/CA2023/051599; search completed Feb. 12, 2024.

*Primary Examiner* — James R Turchen
(74) *Attorney, Agent, or Firm* — CPST Intellectual Property Inc.; Brett J. Slaney

(57) ABSTRACT
A system and method are provided to selectively grant access to permitted portions of address information associated with a delivery route, based on credentials provided by requesting parties. The method includes receiving a first request to obtain geographic address information for a delivery of an item, the first request comprising an identifier of the item and a credential associated with a first requestor; responsive to authorizing the first request based on possession of the credential, determining a first permitted portion of a delivery route based on the first requestor; and responding to the first request by providing at least the first permitted portion of the delivery route to the first requestor. Related computer-readable media are also disclosed.

20 Claims, 15 Drawing Sheets

(56)                    References Cited

U.S. PATENT DOCUMENTS

| | | | | |
|---|---|---|---|---|
| 10,860,993 | B2 | 12/2020 | Kassemi | |
| 2010/0082449 | A1 | 4/2010 | Plautz | |
| 2010/0100233 | A1* | 4/2010 | Lu | B07C 3/18 |
| | | | | 700/226 |
| 2013/0024393 | A1* | 1/2013 | Fleur | G06Q 10/083 |
| | | | | 705/333 |
| 2013/0284800 | A1* | 10/2013 | Gillen | G06K 19/06009 |
| | | | | 235/375 |
| 2017/0004582 | A1 | 1/2017 | Engström | |
| 2019/0311325 | A1* | 10/2019 | Reblin | G06Q 10/0836 |
| 2020/0311670 | A1* | 10/2020 | Sankaran | H04L 9/3263 |
| 2021/0065099 | A1* | 3/2021 | Dixon, Jr. | G06K 19/06028 |
| 2021/0073933 | A1* | 3/2021 | Punnoose | H04W 12/64 |
| 2021/0377260 | A1 | 12/2021 | Phillips | |
| 2022/0038570 | A1 | 2/2022 | Stegall | |
| 2022/0180308 | A1 | 6/2022 | Sheth | |
| 2022/0253791 | A1* | 8/2022 | Andrews | G06Q 10/083 |
| 2023/0033992 | A1 | 2/2023 | Wilson | |

* cited by examiner

110 Generate credential (or data using credential) and provide to interested party 112 Store copy of generated credential (or data) in association with a delivery identifier 114 Use stored credential to authorize a request by comparing to a credential (or data) provided in the request

SYSTEM AND METHOD FOR SELECTIVELY GRANTING ACCESS TO PERMITTED PORTIONS OF DATA

CROSS-REFERENCE TO RELATED APPLICATION(S)

This application is a National Entry of PCT Application No PCT/CA2023/051599, filed on Nov. 30, 2023, which claims priority to U.S. Provisional Patent Application No. 63/480,803 filed on Jan. 20, 2023, the contents of which are incorporated herein by reference in their entirety.

TECHNICAL FIELD

The following relates generally to data security, and more particularly to granting access to permitted portions of data, in particular to selectively granting access to permitted portions of information, and yet more particularly to selectively granting access to address information associated with a delivery route, based on credentials provided by requesting parties.

BACKGROUND

When purchasing an item online or through some channel other than at a physical location, a customer typically needs to specify a shipping address. At present, such customers are required to disclose their precise and complete shipping address directly to a merchant for an order to be fulfilled. However, in some cases, customers may be concerned with privacy issues associated with providing such personal information.

BRIEF DESCRIPTION OF THE DRAWINGS

Embodiments will now be described with reference to the appended drawings wherein.

DETAILED DESCRIPTION

Figure 1:
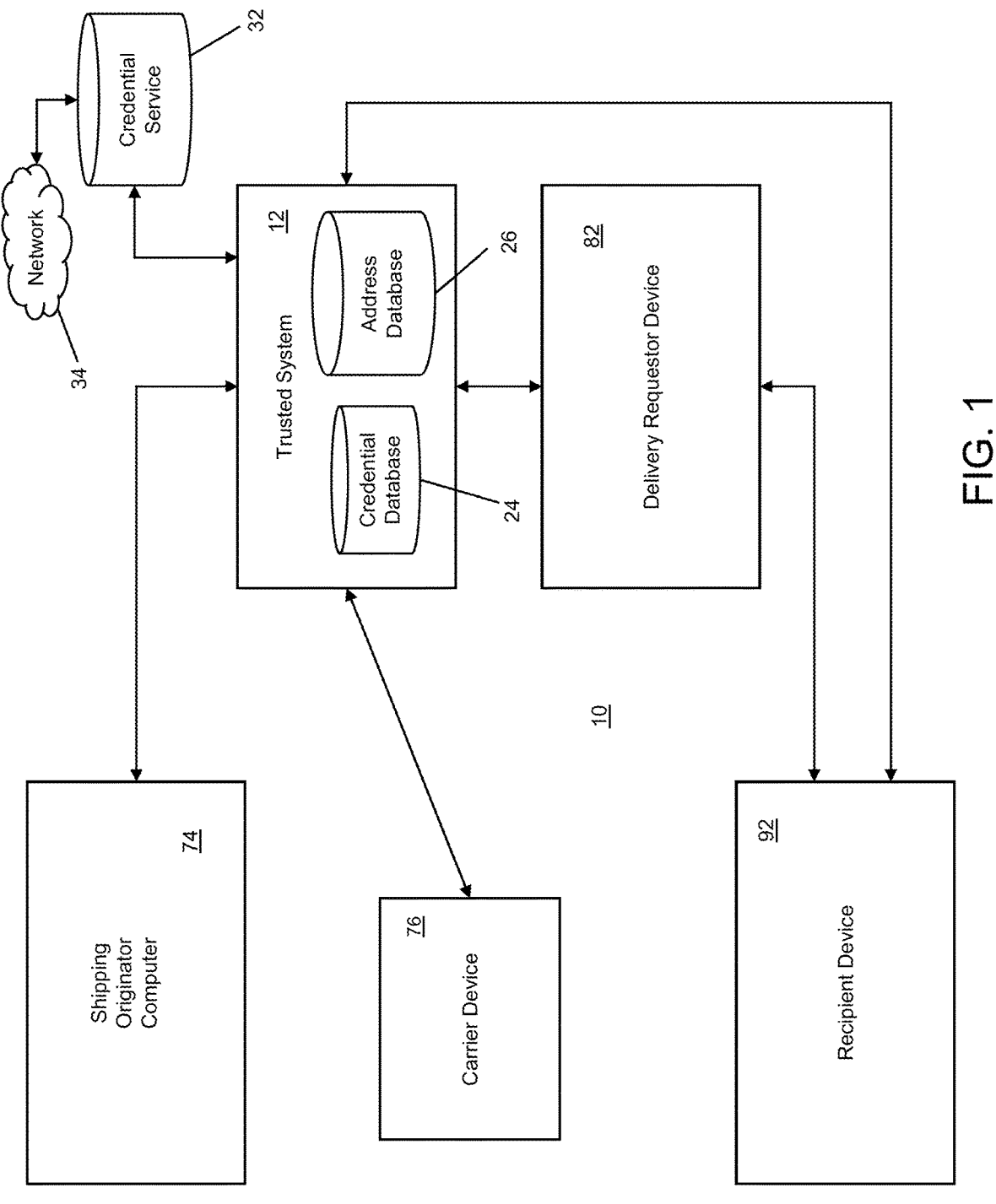
FIG. 1 is an example of a computing environment in which a trusted system is used to selectively grant access to permitted portions of address information associated with delivery routes.

It may be desirable to keep an exact delivery address, such as a home address, unknown to a merchant and individuals involved in the shipping stages prior to the "last mile", the last mile being the shipping stage(s) requiring the exact address to complete the delivery. In an example scenario, a shipment may initially leave a storage facility that houses the inventory and then be transported to a number of distribution centres and sorting centres before arriving at the buyer's door. In such a case, there may not be a need to expose a delivery recipient's exact address (e.g., with exact unit number or street name) until the last mile.

A private delivery process is described herein, wherein the address of a delivery recipient (e.g., a customer, purchaser, or any other ultimate recipient of a delivery) may be stored in/by a trusted system to selectively provide permitted portions of a delivery route to one or more carriers. The trusted system may communicate with each carrier involved in the legs or portions of the delivery route in order to provide instructions with enough address information to enable the carriers to complete their respective leg of the delivery route. The package containing the item being shipped may be labelled with an identifier (e.g., machine-readable indicia such as, for example, a barcode or QR code) such that scanning the identifier on the box or other packaging may enable the trusted system to bind or otherwise create links between the package, the delivery carrier(s), and the address of the delivery recipient. In this way, the address contents may be controlled based on authorized permissions for each leg or portion of the delivery route. Moreover, the delivery recipient's address need not be printed on the package to enable the shipment to occur. This may be done using credentials associated with an authorization to receive certain permitted portions of a delivery route, such that the possessor of the credential is authorized to receive such information, and to enable the trusted system to determine whether a credential is possessed by a requestor.

To preserve the delivery recipient's privacy until the last mile, the trusted system may communicate with the interested parties and have authorizations tied to a level of access to certain address information. The trusted system may, additionally or alternatively, utilize a mechanism to take away or expire information that was granted during the shipping process in order to re-establish privacy over the information granted. The trusted system described herein may further be configured to selectively grant/remove access to portions of a delivery recipient's address information that is associated with a delivery route, based on receiving confirmation that the package has completed a leg or portion of the delivery route (e.g., that it has been received at a particular destination).

In one aspect, there is provided a computer-implemented method comprising: receiving a first request to obtain geographic address information for a delivery of an item, the first request comprising an identifier of the item and a credential associated with a first requestor; responsive to authorizing the first request based on possession of the credential, determining a first permitted portion of a delivery route based on the first requestor; and responding to the first request by providing at least the first permitted portion of the delivery route to the first requestor.

In certain example embodiments, the method can include: receiving a second request to obtain geographic address information for the delivery of the item, the second request comprising the identifier of the item and a second credential associated with a second requestor; responsive to authorizing the second request based on possession of the second credential, determining a second permitted portion of the delivery route based on the second requestor, the second permitted portion being different than the first permitted portion; and responding to the second request by providing at least the second permitted portion of the delivery route to the second requestor. The method can also include confirming that the first permitted portion of the delivery route has been completed prior to providing the second permitted portion of the delivery route.

In certain example embodiments, the delivery route can include a plurality of elements and the first permitted portion can include a subset of the plurality of elements that the first requestor is authorized to access. The subset of the plurality of elements can include enough address information to complete a next portion of the delivery route.

In certain example embodiments, the credential can include location information associated with the first requestor.

In certain example embodiments, the credential can include a digital token, issued by a trusted system, to the requestor. The digital token can be unique to at least one of the requestor and the delivery of the item.

In certain example embodiments, the identifier of the item is provided in a barcode visible on packaging containing the item.

In certain example embodiments, the method can include using the identifier of the item to verify that the first requestor is associated with the delivery route for the item.

In certain example embodiments, the method can include generating the credential; storing a copy of the credential in association with an indication of the delivery route; and using the stored copy of the credential to determine that the possessor of the credential received with the first request is authorized.

In certain example embodiments, the first request and the response to the first request are exchanged via an application programming interface (API) or exchanged via a UI portal.

In certain example embodiments, the first request and the response to the first request are exchanged in interacting with a smart contract.

In certain example embodiments, the credential of the first requestor identifies the first requestor as a last hop in the delivery route, and the permitted portion for the last hop provides a complete delivery address for a recipient of the item.

In another aspect, there is provided a system comprising: a processor; at least one communications module to communicate with electronic devices; and at least one memory. The at least one memory comprises computer executable instructions that, when executed by the at least one processor, causes the system to: receive a first request to obtain geographic address information for a delivery of an item, the first request comprising an identifier of the item and a credential associated with a first requestor; responsive to authorizing the first request based on possession of the credential, determine a first permitted portion of a delivery route based on the first requestor; and respond to the first request by providing at least the first permitted portion of the delivery route to the first requestor.

In certain example embodiments, the system can include instructions to receive a second request to obtain geographic address information for the delivery of the item, the second request comprising the identifier of the item and a second credential associated with a second requestor; responsive to authorizing the second request based on possession of the second credential, determine a second permitted portion of the delivery route based on the second requestor, the second permitted portion being different than the first permitted portion; and respond to the second request by providing at least the second permitted portion of the delivery route to the second requestor.

In certain example embodiments, the system can include instructions to confirm that the first permitted portion of the delivery route has been completed prior to providing the second permitted portion of the delivery route.

In certain example embodiments, the delivery route can include a plurality of elements and the first permitted portion comprises a subset of the plurality of elements that the first requestor is authorized to access.

In another aspect, there is provided a computer readable medium comprising processor executable instructions that when executed by a processor, cause the processor to: receive a first request to obtain geographic address information for a delivery of an item, the first request comprising an identifier of the item and a credential associated with a first requestor; responsive to authorizing the first request based on possession of the credential, determining a first permitted portion of a delivery route based on the first requestor; and responding to the first request by providing at least the first permitted portion of the delivery route to the first requestor.

Turning now to the figures, FIG. 1 illustrates an example of a computing environment 10 in which a trusted system 12 may be used to implement a private delivery process. It can be appreciated that the term "private" as used in association with a delivery process, delivery or shipment described herein, may refer to a selective provision of certain permitted portions of a delivery route and thus a portion of an address or a location along the delivery route that could be associated with the address may be divulged at any given step, with operations executed to hide or hold back at least some address information in at least one of the legs or portions of the delivery route such that only as much address or delivery route information is divulged as is needed for a particular leg or portion of the delivery route. As such, the private delivery process referred to herein may include varying amounts of privacy depending on the leg or portion of the delivery route, from almost no information to the complete address in the last mile (i.e., final leg).

The trusted system 12 may be configured to determine authorizations to access certain information, which may be performed using credentials. Such credentials may be stored by the trusted system 12 including or otherwise having access to a credential database 24. The trusted system 12 may also include or otherwise have access to an address database 26 and may utilize a credential service 32 that may be accessible to the parties in the computing environment 10, via a network 34. In the example shown in FIG. 1, the trusted system 12 may communicate with a shipping originator computer 74, a carrier device 76, a delivery requestor device 82, and a recipient device 92. The recipient device 92 may also be able to communicate with the delivery requestor device 82. The delivery requestor device 82 may refer to a device that makes a request to the carrier device 76 for a delivery service, and may, additionally or alternatively, be referred to as a delivery service requestor device, delivery service initiator device, or delivery service device, by way of example.

Figure 2:
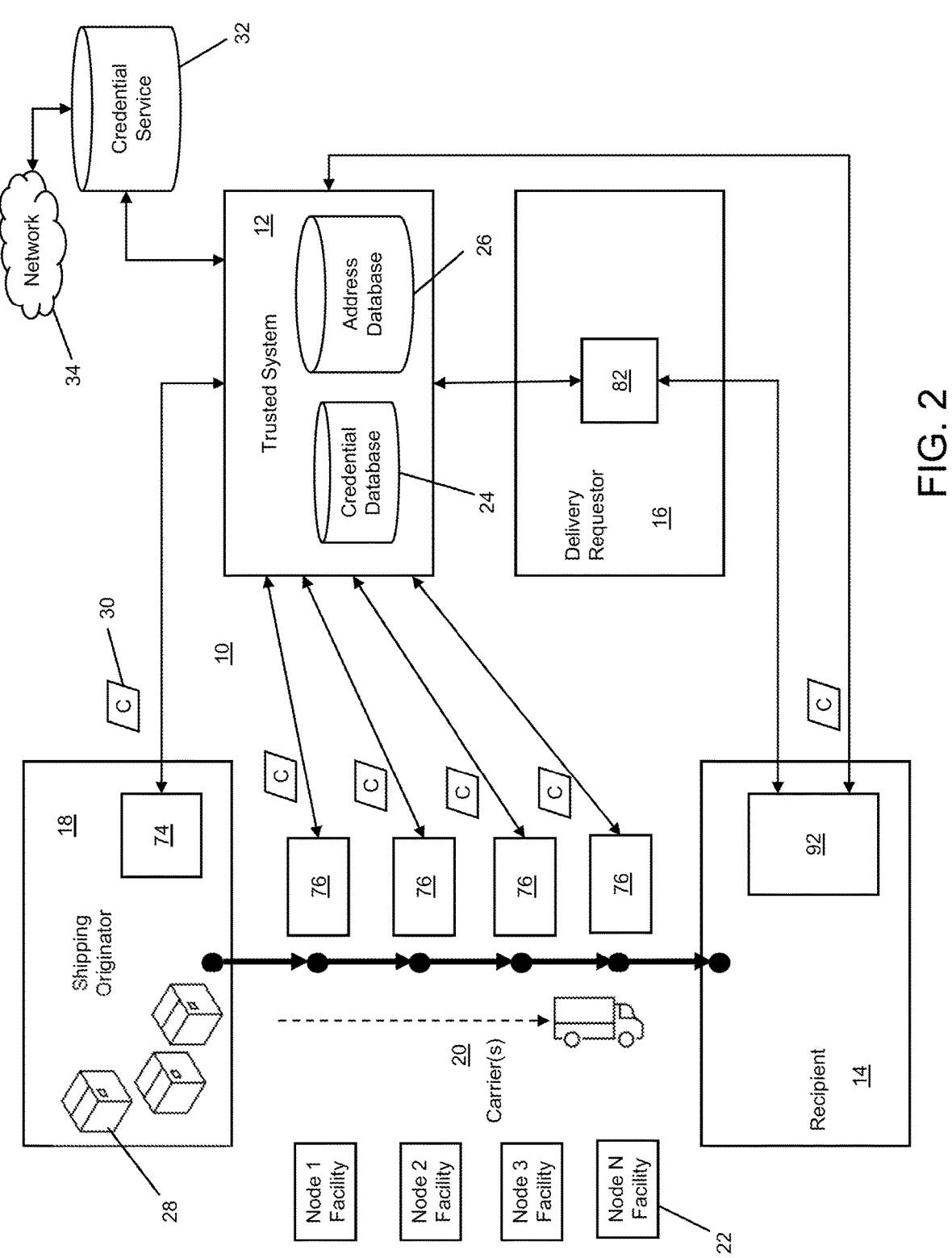
FIG. 2 shows an example of the computing environment of FIG. 1 in an example configuration used by corresponding interested parties.

Referring now to FIG. 2, an example of an implementation of the computing environment 10 is shown which illustrates a number of devices of interested parties in a delivery of a package 28 from an originating location (e.g., a warehouse, store, manufacturing facility, etc.). In the presently illustrated configuration, the trusted system 12 is in communication with each of the interested parties, e.g., via the devices illustrated in FIG. 1 (as shown in FIG. 2 and described further below). While shown as direct communication links in FIGS. 1 and 2, it can be appreciated that such communication links may, additionally or alternatively, be indirect.

The trusted system 12 may be communicated with by a delivery requestor 16 such as a merchant, that provides a storefront or electronic interface for a delivery recipient 14, e.g., a customer that makes a purchase from the merchant that requires the delivery of a package 28.

The shipping originator 18 assembles the item 25 (i.e., that requires delivery to delivery recipient 14) into package 28. In some embodiments, the item 25 may not be placed in a packaging 27 during this assembly but may simply be designated a package 28. The shipping originator 18 may refer to any entity, location, facility, or party that is in possession of the item 25 at the time that the delivery request is made. The shipping originator 18 may also function as a carrier 20 (i.e., of the first leg or portion of the delivery route). The shipping originator 18 may include a delivery truck, retail establishment, or even another customer's location who is returning a package 28. The configuration shown in FIG. 1 is illustrative and may be adapted to any real-time and fully reconfigurable shipping and/or e-commerce environment.

Between the shipping originator 18 (where the package 28 being delivered begins its journey) and the delivery recipient 14 (where the package 28 is meant to be delivered), at least one carrier 20 is used to deliver the package 28 from the shipping originator 18 to the recipient 14 via at least one leg, portion, or segment in a delivery route. It can be appreciated that the carrier(s) 20 and the shipping originator 18 may be part of the same organization, for example, drivers associated with a shipping company or can be part of different organizations, for example, drivers that carry goods between the legs of the delivery route for a shipping company or merchant. That is, the relationships between the parties shown in FIGS. 1 and 2 may vary and need not affect the integration or usage of the trusted system 12. Moreover, additionally or alternatively, the trusted system 12 while shown as a separate entity in FIGS. 1 and 2 may be provided by or with one or both of the delivery requestor 16 (e.g., using delivery requestor device 82), or the shipping originator 18 (e.g., using shipping originator computer 74). In the illustrated example, the trusted system 12 is provided by a third party service that can serve multiple different delivery requestors 16 and multiple different shipping originators 18.

The trusted system 12 in this example may also communicate with a separate credential service 32, which may be a repository or vault operating as a software service to hold, generate, distribute or otherwise handle credentials 30 (shown as "C" in FIG. 1 for brevity and ease of illustration) for the parties shown in FIGS. 1 and 2. To that end, the credential service 32 may be accessible to any of the parties via a network 34. Such communication network(s) 34 may include a telephone network, cellular, and/or data communication network to connect different types of client- and/or server-type devices. For example, the communication network 34 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet). In this way, the handling of credentials 30 used to obtain permitted portions of address information can be offloaded to a separate service, such as a digital wallet, blockchain/smart contract vendor, or other secure service. For example, the credential service 32 may be provided by a third party entity that enables users to create accounts that store and manage credentials 30. The credential service 32 could be used to create the credentials used to authorize access to the permitted portions of the delivery route such that the trusted system 12 can rely on a credential 30 issued by the credential service 32 as an authorization to obtain the permitted portions of the delivery route. The mechanism used to create, manage, and control access to the credentials 30 may be built into existing or custom-built digital wallet applications, smart contracts stored on a blockchain managed by the third party service or a digital vault or similar protected storage device. To enable the devices in the computing environment 10 to access the trusted system 12 and a third party such as the credential service, login mechanism may be employed such as, for example, a login mechanism based on/providing a single sign-on (SSO) methodology to provide secure authentication of individuals. For example, the Security Assertion Markup Language (SAML) login standard that is used to access applications in multiple contexts based on a SSO methodology may be employed.

The trusted system 12 may be configured to perform authorizations, which may use credentials 30 and thus in some embodiments may include, store, or otherwise have access to the credential database 24 to store copies of credentials 30 that are generated or at least used by the trusted system 12 to authorize parties based on possession of a credential 30, provided to the trusted system 12 in a request to obtain address or delivery route information. The trusted system 12 may additionally include or have access to the address database 26 to store address information when the trusted system 12 is responsible for storing and releasing such address information. A delivery route may be one or more sequenced destinations. For example, a delivery route may specify various locations or areas such as, for example, one or more of a region, city, neighborhood, street, and/or the like and certain address information of the recipient address or gleaned from that recipient address can be used directly or indirectly to inform a shipping originator 18 or carrier 20 of the next leg in the delivery route for a specific item 18. Moreover, a delivery route may include paths, portions, segments, or legs that deviate from a point-to-point route from the shipping originator 18 to the delivery recipient 14 due to intermediate nodes being required to utilize a particular shipping or logistics network. As such, the carriers 20 may be associated with or be instructed to deliver to one or more node facilities 22, which may include a warehouse, next delivery vehicle or any other location or entity in which the package 28 is handed off and, if necessary, temporarily stored during a delivery.

The trusted system 12 may be implemented using a trusted service, a trusted application, or other secure mechanisms. For example, the trusted system 12 may be provided by a third party trusted authority that may be configured to generate, store and handle credentials 30. The trusted system 12 may be a stand-alone device or service as illustrated in FIGS. 1 and 2 or may be provided by a server application or service deployed on a computing device controlled by an organization such as the shipping originator 18 or delivery requestor 16 shown in FIG. 2.

The following principles may apply to the trusted system 12, example embodiments of which are discussed below. The trusted system 12 may be accessible to interested parties, at least temporarily or intermittently to issue credentials 30, may receive requests for address information, and may provide appropriate responses based on the level of access granted to the requestor. In addition to being accessible to the interested parties, the trusted system 12 may use a secure mechanism to store and selectively release permitted portions of a destination address or delivery route. To selectively provide permitted portions of a delivery route, the recipient address may be parsed (if capable of being so parsed) into a hierarchy of location specificities, for example, continent, country, province/state, region/city, street, direction (N/S or E/W), number, unit, etc. In some embodiments, the hierarchy may be based (or include levels based on) other schemes for dividing up space and/or time. For example, the hierarchy may be based on a division of the Earth's surface into a series of approximately nested hexagonal grids, each subsequent nesting providing an increase in location specificity. Address information including the recipient address and/or data based on the recipient address may be stored securely by the trusted system 12. For example, a table entry corresponding to the address information may be stored in a secure vault, or the address information may be stored within a secure function such that by receiving the correct inputs, the vault or function returns the appropriate level of address data. Such a vault or function may be proprietary/custom built and/or may utilize various available technologies such as smart contracts or non-fungible tokens (NFTs) stored in an immutable ledger on a blockchain.

The secure function may utilize cryptographic mechanisms such as hash functions or other ciphers that are configured to encrypt certain data and reveal that data based on a corresponding decryption initiated by certain inputs to which the encrypted version(s) is/are bound. For example, a component of the address data may be encrypted using a combination of a unique identifier bound to the package 28 (e.g., the contents of ID 67 of the package 28, discussed further below) as well as an identifier or token (e.g., credential 30) of the interested party permitted to retrieve the encrypted data in plaintext form. Other encryption techniques may be used that are symmetric or asymmetric. Example encryption systems include, for example, DES, AES, RSA, etc. Additional values may be used to bind the data to the interested party, such as by requiring location data (e.g., an originating location and/or destination location for the corresponding leg of the delivery route).

The trusted system 12 may, in some embodiments, be controlled by the delivery requestor 16 of the shipment (e.g., merchant) or by the carrier 20 or shipping originator 18. The trusted system 12 may require a delivery route (or portions thereof) with a list of the interested parties involved in executing the shipment to enable tokens or other credentials 30 to be issued for each interested party. This may be done pre-emptively or determined at each leg or portion of the delivery route by communicating with the trusted system 12. For example, an e-commerce store of a delivery requestor 16 (e.g., a merchant) may offer an option to have an anonymous or secure shipment, which then redirects the delivery recipient 14 (e.g., customer) to the trusted system 12 (or a shipping originator 18 or carrier 20 that utilizes the trusted system 12). The shipping originator 18 may generate a delivery route (or portions thereof) based on its logistics and delivery networks at this time or as the package 28 completes one or more legs or portions of the delivery route, and may provide the generated delivery route (or portions thereof to the trusted system 12. This delivery route (or portions thereof) may include or be associated with a party (e.g., a carrier 20) involved in each leg or portion of the delivery route and/or the origin and/or destination locations of each leg or portion. In other embodiments, the trusted system 12 may, additionally or alternatively, determine the delivery route (or portions thereof). The trusted system 12 may determine the delivery route (or portions thereof) based on data received from, e.g., the shipping originator 18 or carrier 20. For example, the trusted system 12 may determine a delivery route (or portions thereof) based on the delivery route (or portions thereof) generated by the shipping originator 18 or carrier 20.

As discussed above, at each hop (also referred to herein interchangeably as a "leg" or "segment" or "portion"), the interested party or steward of the package (e.g., carrier 20 for that hop or personnel directing boxes within a facility) provides a token or other credential 30 to the trusted system 12 to be given the respective permitted portion 64. The permitted portion 64 may contain necessary address information or portion of address information that permits the next leg or portion of the delivery route. Using tokens as an example of credential 30, each carrier 20 may be issued their own token that is a one-time token unique to them or a single one-time token can be issued for that private delivery process and is passed between the parties. For example, the trusted system 12, when it is informed of the next destination, may send the single token or otherwise allow the token to be retrieved by the next party so that it is passed along the chain of parties involved in the shipment. In another example, a permission token may be generated by the trusted system 12 and transferred to a blockchain wallet address associated with the carrier 20. Upon receiving confirmation that the package 28 has arrived at the next leg of the fulfillment process, the trusted system 12 may request that the permission token is transferred to the wallet address associated with the next party. In some embodiments, the next party may receive a different permission token (e.g., from the trusted system 12). In some embodiments, the different permission token received by the next party may be generated based on the permission token (or some portion thereof), which may ensure that the next party received or was otherwise able to interact with the first permission token (and, in turn, mitigate against the risk of a segment of the delivery route being skipped or hijacked). Once the token has been transferred, a UI in an app or browser may be updated to reveal address information required for the next party to move the package onwards. Additionally, the previous party may then be no longer able to access the buyer's address information via the trusted system 12.

Whether tokens are issued as credentials 30 for each party or a single one is passed along the chain, the trusted system 12 may be configured to do so either pre-emptively or in real-time. The credentials 30 may be one-time credentials that are unique to a specific shipment, such as one-time codes, one-time keys, etc. To use a one-time credential 30, the trusted system 12 or credential service 32 may obtain a short-term value such as a date identifier or shipping number that expires after a certain amount of time or is bound to a single use in the case of a shipping number. The short-term value can be used to generate the credential 30 and be used as an input to permit the credential 30 to be used to authorize the entity that possesses the credential 30. For example, if the short-term value corresponds to a date and the current date is included as an input to a function used to authorize access to the permitted portion(s) of the delivery route such that if the current date is later than the date identifier, the permitted portion(s) are not authorized for the provider of the credential 30. For one-time codes, the codes issued can be stored in a database, table, or manifest and removed when expired such that a comparison cannot be made after the one-time code's expiration. The expiration of the one-time codes may be triggered by determining that the delivery route has been completed or a portion thereof depending on the possessor of the credential 30. Alternatively, the trusted system 12 could maintain a list of trusted user IDs. For example, sophisticated online merchants with ongoing relationships with one or more carrier(s) 20 may establish a "white list" of carrier(s) 20 (e.g., trucks, sub-contractors) and facilities such that the trusted system 12 may use the user ID from the white list instead of issuing tokens. The user ID along with the unique ID of the package may thus be used by the trusted system 12 to release the appropriate address information for the next hop. The credentials 30 used by the trusted system 12 may be based on location information; for example, the trusted system 12 may determine that a requestor of address information is authorized based on their location, which may be associated with a facility in the delivery route.

The level of specificity/detail of the address information for such a next hop may be determined automatically or included (i.e., automatically included) in the request. For example, if the carrier 20 has knowledge of multiple sorting or distribution centers, they may request the minimum level, or a reduced level, of address information required to determine the next destination. For example, the carrier 20 may require province/state or city in addition to country to be able to determine the next leg or portion of the delivery route. As such, the request and response mechanism used between the interested parties and the trusted system 12 may vary in complexity or have fields that may or may not be used depending on what information the carrier 20 requires for that hop.

The trusted system 20 may utilize various functions or mechanisms to protect and release the different levels of address specificity/detail based on determining that the possessor of a credential 30 is authorized to obtain the requested information. For example, this may range in complexity from a secure vault or protected database with look-up table entries created for each private delivery process to cryptographic functions or smart contracts on a blockchain. Regardless of the complexity of the trusted system's underlying function or mechanism, the above principles may be used to ensure the necessary protections and authorizations can be performed. Multiple mechanisms may be used. For example, a public key may be provided by a carrier 20 to allow the trusted system 12 to verify that carrier 20 while a one-time token is used to, in parallel, authorize that carrier 20 to act for the delivery requestor (e.g., merchant) and the delivery recipient 14 (e.g., buyer) in that specific private delivery process. That is, multiple layers of protection may be applied by the trusted system 12.

When considering the expiration of permissions, tokens or other credentials 30 may be expired by the trusted system 12, such that a subsequent attempt to use them would be denied. The trusted system 12 may use smart contract functions to expire a credential 30, such as, e.g., by changing the attributes of a token associated with a blockchain wallet address. Additionally or alternatively, the trusted system 12 may alter or delete data made available at, e.g., URLs referenced by a token.

The trusted system 12 may also be configured to handle change requests along a delivery route. For example, if the trusted system 12 determines the delivery route (or portions thereof) in advance, the trusted system 12 may modify the delivery route (or portions thereof), e.g., by exchanging messages with a carrier 20.

The devices shown in FIGS. 1 and 2, such as the delivery requestor device 82 or the carrier device 76, may be set up to communicate with the trusted system 12 in various ways. For example, an app- or browser-based UI portal may be used to enable entry of information to initiate requests and to receive and read out the returned address information. An API or an interface may, additionally or alternatively, be used to enable interaction with the trusted system 12. In other embodiments, a UI portal may be combined with an API or interface so as to provide the functionality of each. As noted above, other mechanisms such as smart contracts may be used that are created for each private delivery process and stored on a blockchain to execute the functions performed by the trusted system 12 as noted above, automatically. That is, a smart contract may be created/issued and used as part of the trusted system 12 (e.g., as the credential service 32) by having the carrier device 76 of a trusted carrier 20 or the merchant (delivery requestor 16) generate (or initiate generation of) such smart contracts using the trusted system 12.

Figure 3:
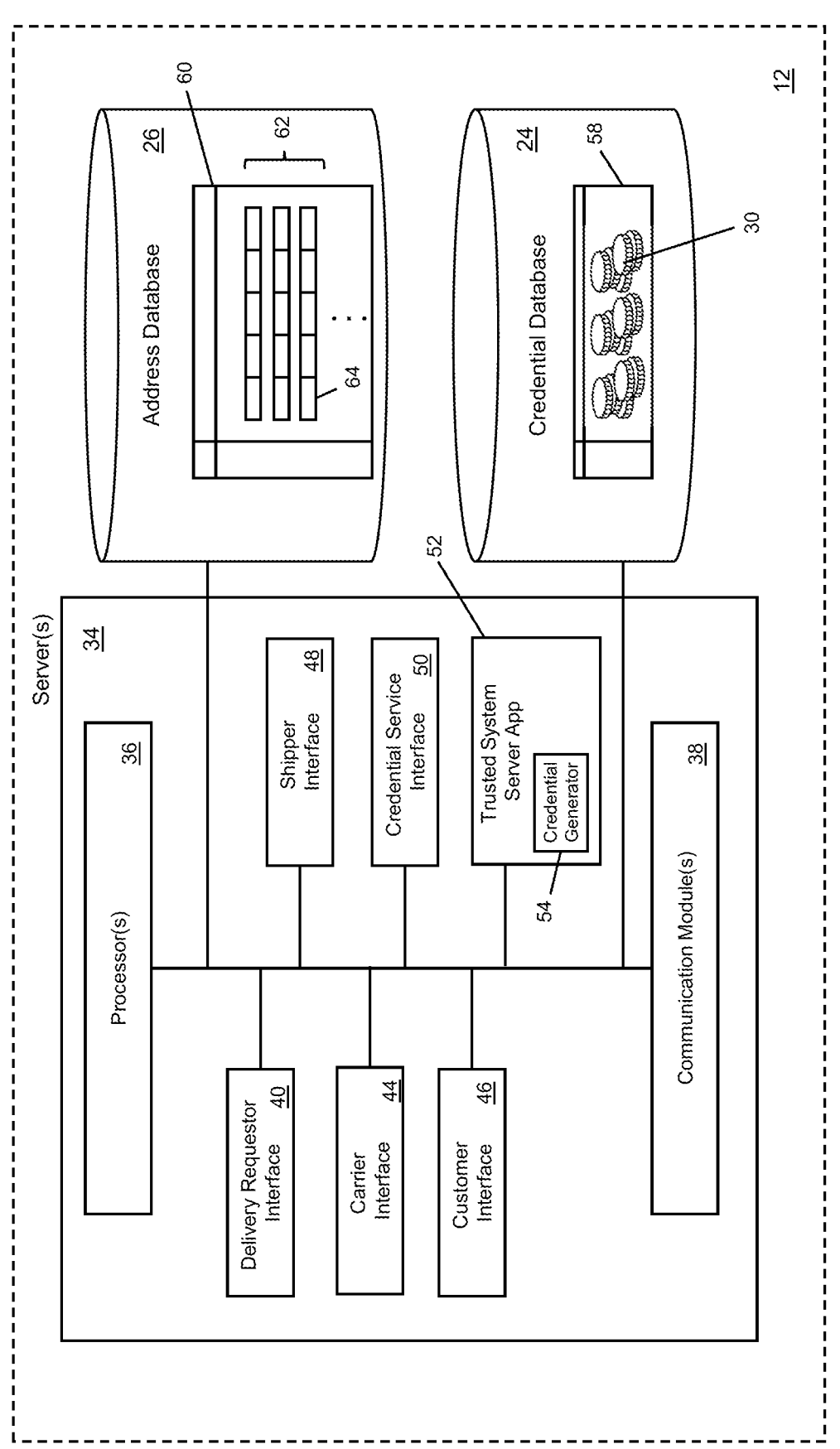
FIG. 3 is a block diagram illustrating an example of a configuration for the trusted system.

Referring now to FIG. 3, an example of a configuration for the trusted system 12 is shown. The trusted system 12 may be implemented using one or more real or virtual electronic devices, including, e.g., a single server, a distributed computing environment, etc. For example, the trusted system 12 may be implemented using the multiple servers 34. Referring to FIG. 3, the servers 34 may include one or more processors 36 and one or more communications modules 38. Communications module(s) 38 enable the servers 34 to communicate with one or more other components, elements or parties of the computing environment 10, such as the delivery requestor 16, recipient 14, shipping originator 18, carrier(s) 20, and credential service 32. While not delineated in FIG. 3, at least one memory or memory device that can include a tangible and non-transitory computer-readable medium having stored therein computer programs, sets of instructions, code, or data to be executed by processor(s) 36. The processor(s) 36 and communication module(s) 38 are connected to each other via a data bus or other communication backbone to enable components of the servers 34 to operate together as described herein.

In the example shown in FIG. 3, the communication module(s) 38 include: a delivery requestor interface 40, which enables the servers 34 to interact with a delivery requestor device 82; a shipper interface 48 to enable the servers 34 to interact with a shipping originator computer 74; a carrier interface 44 to enable the servers 34 to interact with device(s) 76 used by the carrier(s) 20; a customer interface 46 to enable the servers 34 to interact with a recipient device 92; and a credential service interface 50 to enable the servers 34 to interact with a credential service 32, if one is used. The various interfaces shown in FIG. 3 may take the form of one or more APIs, may be created using a software development kit (SDK), and/or may be provided by any other software, plug-in, agent, app, or tool that allows the servers 34 to be integrated with or within an application associated with another interested party in the computing environment 10. For example, the interfaces shown in FIG. 3 may take the form of apps that enable communications between the respective parties via UIs, APIs, or both.

The servers 34 may provide a trusted system server app 52 (e.g., as a result of instructions executed on the one or more processors 36). The trusted system server app 52 may be used to provide a backend server application that can communicate with front end trusted system (client) apps 53 (see FIG. 3, among others) as described in greater detail below. The trusted system server app 52 may enable other parties in the computing environment 10 to request and receive permitted portions of address information associated with a delivery route. The trusted system server app 52 may include a credential generator 54 to enable the servers 34 to provision credentials 30. For example, the credential generator 54 may generate tokens, one-time codes, location tags, or other credentials 30 for parties to be used in each leg or portion of a delivery route.

The trusted system 12 may also include or otherwise provide the servers 34 with access to a credential database 24 and/or an address database 26. The credential database 24 may provide a memory, repository, vault, secure module or other storage element to store credentials 30 associated with interested parties in the computing environment 10. The credential database 24 may include a look-up table 58 or other accessible repository of information to enable the servers 34 to associate credentials 30 with the interested parties. The look-up table 58 may be dynamic to allow for ephemeral credentials 30 such as one-time keys or expiring codes, tokens or other data elements. The address database 26 may include a look-up table 60 or other mechanism to enable the servers 34 to store address entries 62 associated with delivery recipients 14. As illustrated in FIG. 3, each address entry may be divided into multiple parts or portions 64 that have a permission associated therewith. For example, a region or country portion 64 may be permitted for all parties in the delivery route, while a street name and number may be permitted only to the last mile carrier 20. The address portions 64 may be discrete portions of an actual mailing address and/or may be derived from the actual mailing address. For example, a regional portion 64 may be derived from a country to indicate that the delivery recipient 14 is located in North America versus Europe. That is, a regional portion 64 may refer to a geographical area that is not a discrete element of an address. Another example may include a regional portion 64 that corresponds to a neighborhood within a city. Other examples may include a hemisphere or custom grouping of jurisdictions such as the Eastern seaboard, Atlantic states or provinces, Pacific states or provinces, etc.

Figure 4:
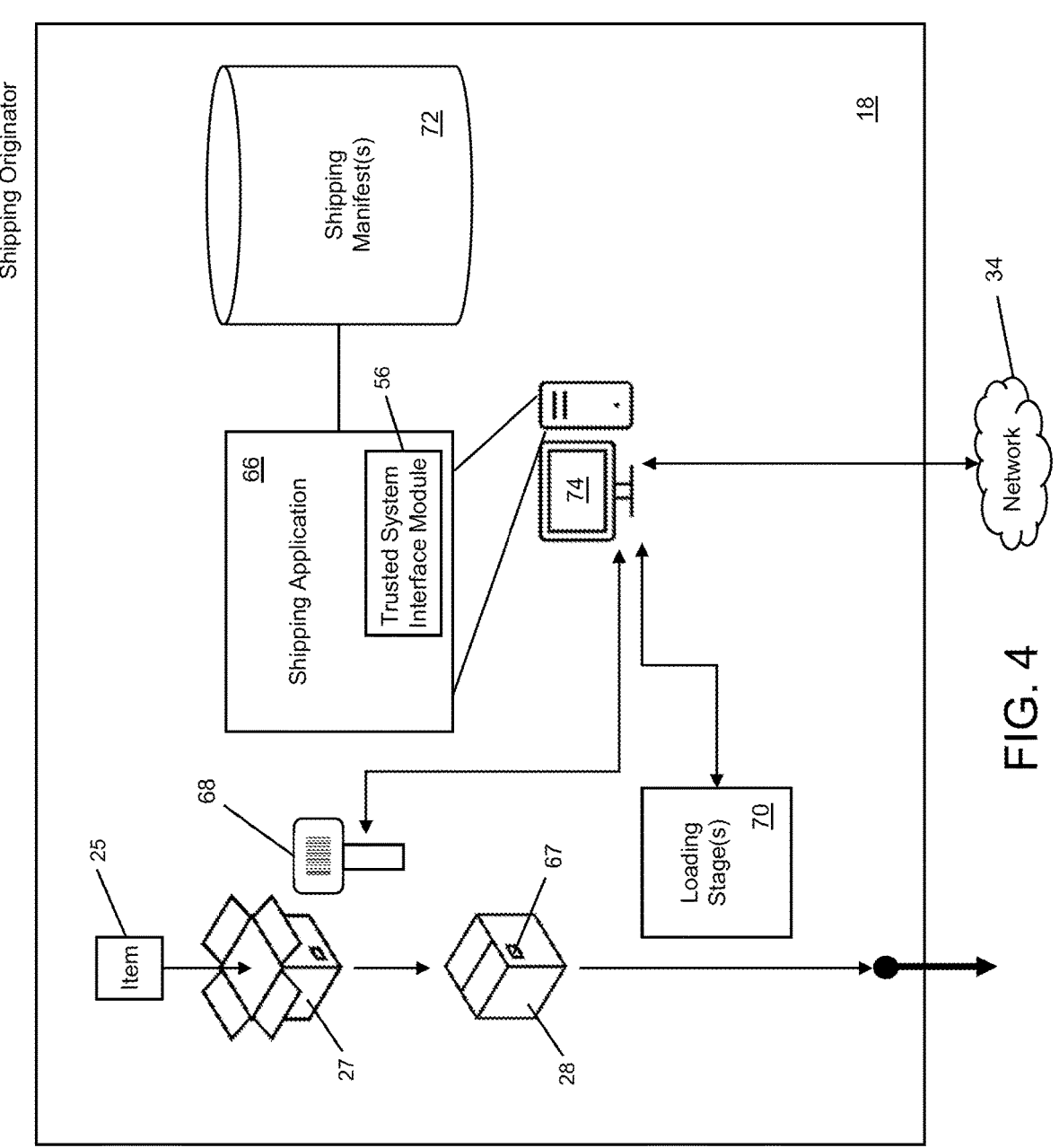
FIG. 4 is a block diagram illustrating an example of a configuration for a shipping originator facility.

FIG. 4 illustrates an example of a schematic configuration for a facility or location associated with the shipping originator 18. The shipping originator 18 may include stock or inventory or may otherwise hold a quantity of items that are to be shipped as packages. The item 25, for example, may be inserted into a shipping box, container, or packaging 27 to assemble the package 28 that is to be shipped. In some embodiments, the item 25 may itself be a package 28 that is itself shipped (e.g., where the item 25 is shipped without being placed in other packaging).

The shipping originator 18 differs from the carrier(s) 20 because of its access to the item 25 (i.e., before it is placed in, assembled into, or otherwise becomes package 28), which may allow the shipping originator 18 to generate and store associations between the item 25 and, e.g., the delivery route (or portions thereof) or one or more designated carriers (e.g., associated with portions of the delivery route). Where a shipping originator does not have access to item 25 (e.g., because it receives it in package 28 and cannot open the package 28), its resultant operations may be very similar to that of a carrier (unless, for example, it is able to obtain commensurate information about item 25 despite not having access to it).

Additionally or alternatively, the shipping originator 18 may also be or be related to the delivery requestor 16. For example, the delivery requestor 16 (e.g., a merchant) may have its own warehouses that facilitate the assembly of items into packages (i.e. before each package completes its first leg of the delivery route).

Where two or more of the shipping originator 18, the delivery requestor 16, and/or the carrier(s) 20 are the same party or are related parties, the device(s) used by this party or these parties (i.e. to carry out the private delivery process) may be one or more of a shipping computer 74, a delivery requestor device 82, and/or a carrier device 76 at the same time (or otherwise be able to carry out their functions).

The package 28, prior to being shipped, may be prepared so that it includes an identifier (ID) 67 that enables the package 28 to be identified and distinguished from other packages. The ID 67 may contain and/or be based on one or more images, numbers, alphanumeric strings, and/or other identifying features. For example, the ID 67 may comprise a QR code or a bar code. The one or more images, numbers, and/or alphanumeric strings may be unique, or one or more of them may be selected from a pool, with each such image, number, and/or alphanumeric string being reusable and/or expirable. The ID 67 may be pre-printed on the packaging 27 and/or printed and affixed as a label. The contents of the ID 67 (e.g., the one or more images, numbers, and/or alphanumeric strings) may be bound to the item 25 as it is being inserted into packaging 27 (e.g., by the shipping originator 18). Additionally or alternatively, the contents of ID 67 may be bound to the item 25 through a scanning process, such as, for example, one by which the ID 67 is scanned using a scanner 68 (e.g., by the shipping originator 18). By using the trusted system 12, the ID 67 may not need to include any address information thus preserving the privacy of the recipient's personal information unless needed to perform a leg in the delivery route. The ID 67 may take the form of a scannable/machine readable indicia such as a barcode, QR code, a human/visibly readable numerical or alpha-numerical code (that could be manually entered without scanning and/or scanned using optical character recognition (OCR) techniques), an RFID code (requiring an RFID reader—not shown), etc.

A shipping originator computer 74 may, upon receiving the contents of ID 67 (e.g., via scanner 68) communicate with a loading stage 70 of the facility to have the next leg of the delivery route provided to the first carrier 20, e.g., a truck that will pick up the package 28 from the shipping originator 18 or a truck owned and operated by the shipping originator 18. The shipping originator computer 74 may utilize a shipping application 66 that may have access to one or more shipping manifests 72. The shipping application 66 may include client-side trusted system interface module 56 (also shown using the shortform TSIM) to interact with the trusted system 12 (e.g., via the shipper interface 48). The shipping originator computer 74 may interact with the trusted system 12 to determine the permitted portion of the delivery route or other address information to enable a first leg or portion of the delivery route. The shipping originator computer 74 is connected to the computing environment 10 via a network 34.

Figure 5:
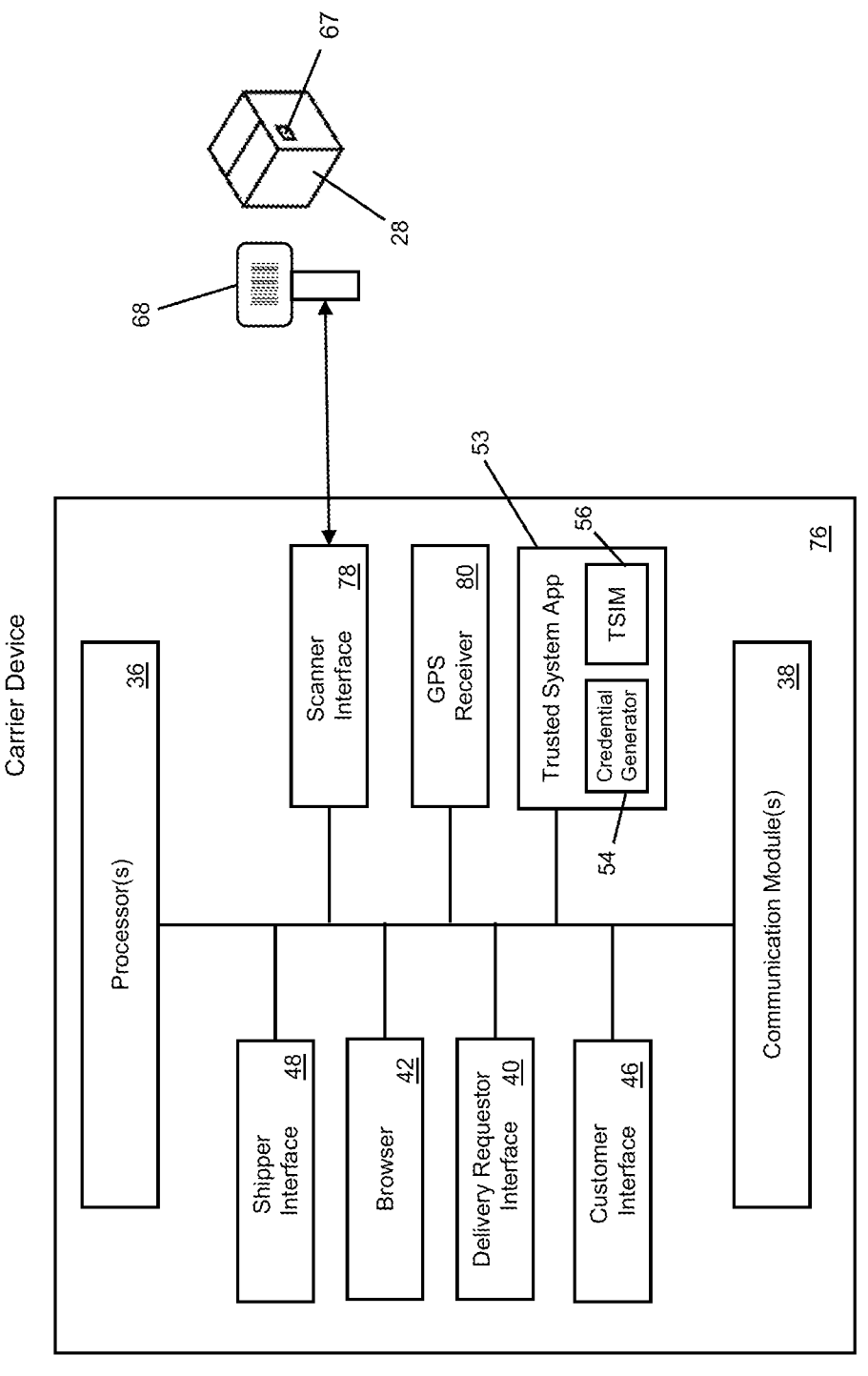
FIG. 5 is a block diagram illustrating an example of a configuration for a carrier device.

Referring now to FIG. 5 a carrier device 76 is shown, which may be an electronic device utilized by a carrier 20 in connection with making a delivery or for the purpose of communicating with the trusted system 12. Such electronic devices can include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a virtual reality (VR) device, an augmented reality (AR) device, etc. The carrier device 76 may include one or more processors 36 and one or more communications modules 38. While not delineated in FIG. 5, the carrier device 76 may include at least one memory or memory device that can include a tangible and non-transitory computer-readable medium having stored therein computer programs, sets of instructions to be executed by processor(s) 36. The processor(s) 36 and communication module(s) 38 are connected to each other via a data bus or other communication backbone to enable components of the carrier device 76 to operate together as described herein. FIG. 5 illustrates examples of modules and applications stored in memory on the carrier device 76 and operated by the processor(s) 36. It can be appreciated that any of the modules and applications shown in FIG. 5 may, additionally or alternatively, be hosted externally and be made available to the carrier device 76, e.g., via a communications module 38 of the carrier device 76.

The carrier device 76 in this example may include one or more of a shipper interface 48 to enable the carrier device 76 to interact with a shipping originator computer 74, a delivery requestor interface 40 to enable the carrier device 76 to interact with a delivery requestor device 76, a customer interface 46 to enable the carrier device 76 to interact with delivery recipients 14 via delivery recipient devices 92, and a scanner interface 78 to enable the carrier device 76 to interact with a scanning device 68 or equivalent functionality such as a camera (not shown). The scanner interface 78 allows the carrier device 76 to use a scanner 68 to scan the ID 67 of the package 28 to identify the item 25 and obtain a permitted portion of the delivery address or delivery route. As noted above, the ID 67 may take the form of a visibly readable numeric or alpha-numeric code that can be manually entered without the need for a scanner 68. The carrier device 76 may include a browser 42, which may be usable to provide web-based interfaces for or with other parties in the computing environment 10. Additionally or alternatively, the carrier device 76 may include a trusted system app 53. The trusted system app 53 may be similar to or the same as that of the shipping originator computer 74 and devices (other than the trusted system 12) in order to interact with the trusted system 12. In this example, the trusted system app 53 may include the TSIM 56 to interact with the trusted system 12 (e.g., via the carrier interface 44) to obtain the permitted portion 64 of the address information or delivery route. The trusted system app 53 may include a credential generator 54 to enable the carrier device 76 to generate a credential 30 for the trusted system 30 or to replicate a credential 30 stored by the trusted system 12. The credential generator 54 may, additionally or alternatively, be used to generate a location-based tag using a GPS receiver 80 or similar location-based device. In this way, the credential 30 may be based on, include, or be bound by a location identifier to provide further security in determining that a particular carrier device 76 is authorized.

Figure 6:
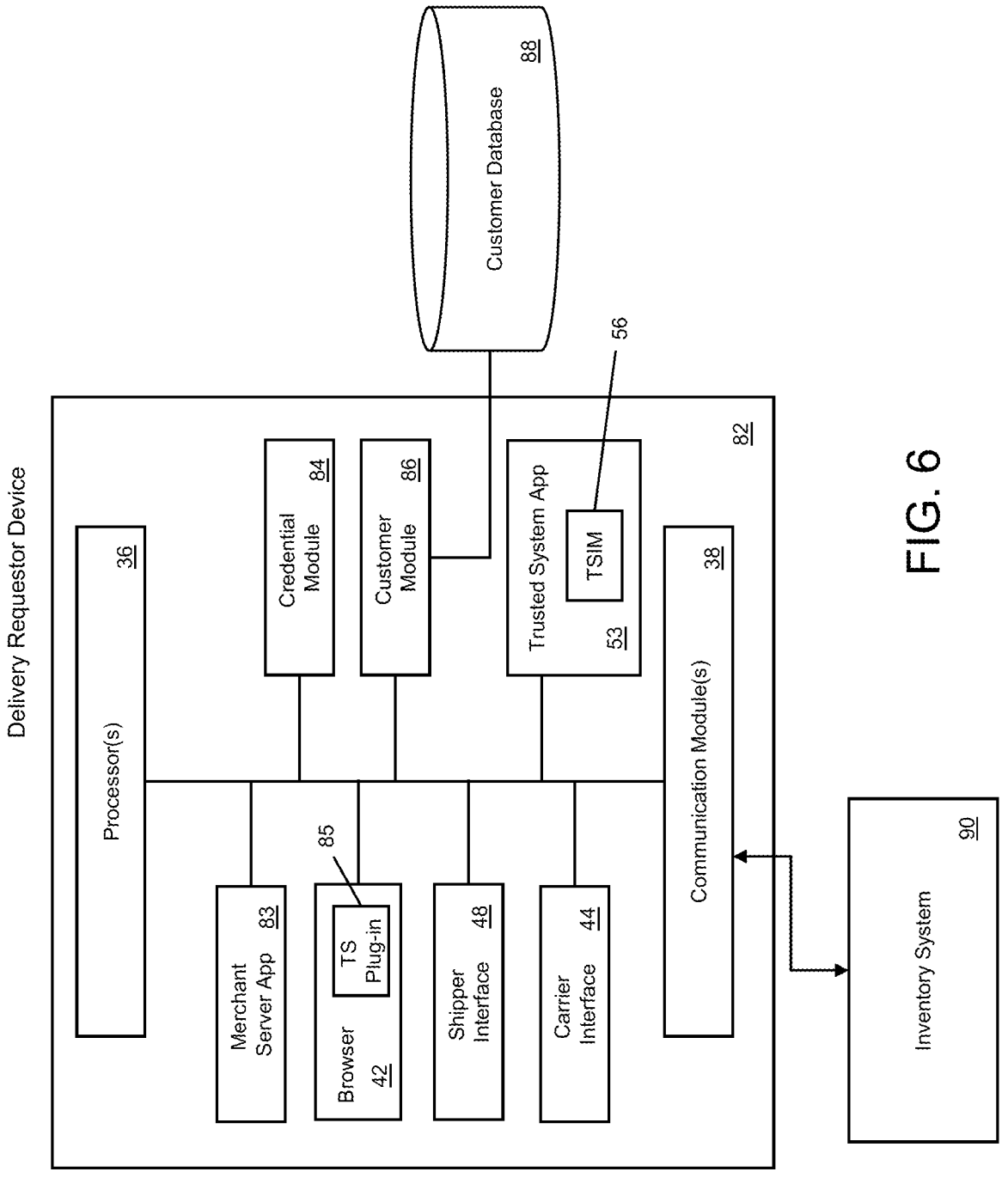
FIG. 6 is a block diagram illustrating an example of a configuration for a delivery requestor device.

FIG. 6 illustrates an example of a configuration for a delivery requestor device 82, which may be an electronic device utilized by a delivery requestor 16 such as a merchant, in connection with arranging a delivery for a customer using the trusted system 12. Such electronic devices may include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a VR device, an AR device, etc. The delivery requestor device 82 may include one or more processors 36 and/or one or more communications modules 38. While not delineated in FIG. 6, the delivery requestor device 76 may include at least one memory or memory device that may include a tangible and non-transitory computer-readable medium having stored therein computer programs, sets of instructions to be executed by processor(s) 36. The processor(s) 36 and communication module(s) 38 may be connected to each other via a data bus or other backbone to enable components of the delivery requestor device 82 to operate together as described herein. FIG. 6 illustrates examples of modules and applications stored in memory on the delivery requestor device 82 and operated by the processor(s) 36. It can be appreciated that any of the modules and applications shown in FIG. 6 may, additionally or alternatively, be hosted externally and be made available to the delivery requestor device 82, e.g., via a communications module 38 of the delivery requestor device 82.

Figure 7:
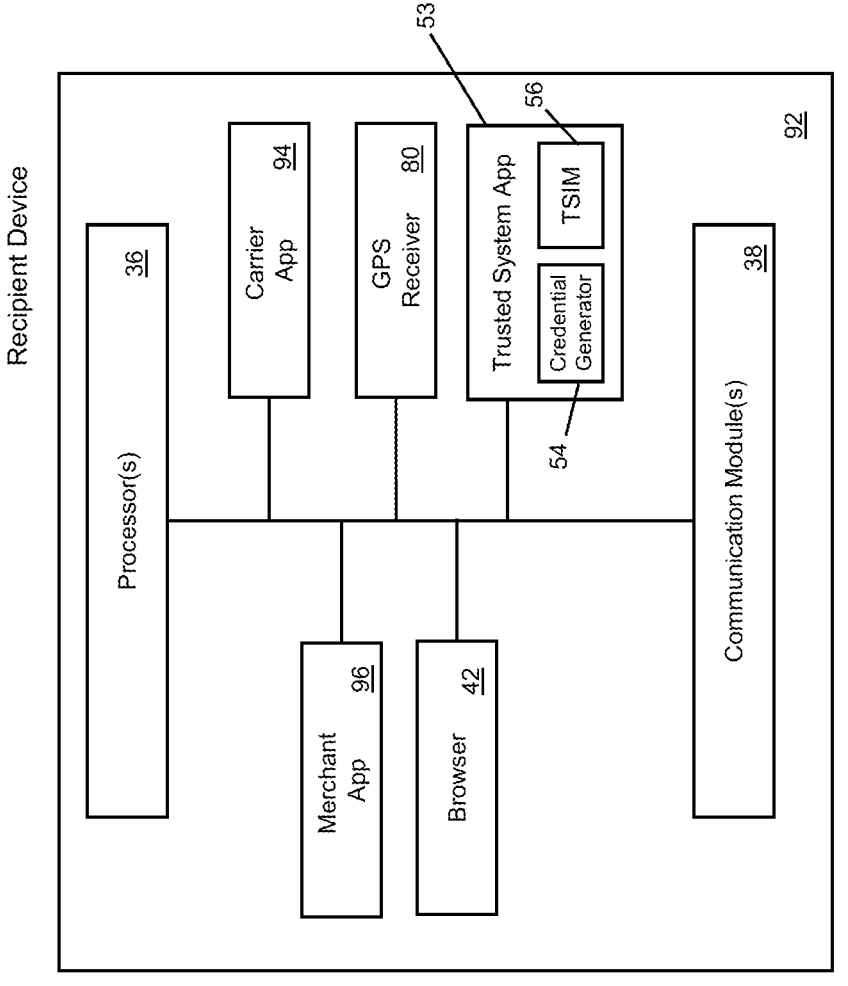
FIG. 7 is a block diagram illustrating an example of a configuration for a recipient device.

The delivery requestor device 82 in this example may provide a merchant server app 83 that permits the delivery requestor device 82 to communicate with a recipient device 92 (e.g., via the merchant app 96 of the recipient device 92; see FIG. 7. The delivery requestor device 82 may include one or more of a shipper interface 48 to enable the delivery requestor device 82 to interact with a shipping originator computer 74; and a carrier interface 44 to enable the delivery requestor device 82 to interact with carrier device(s) 76 used by the carrier(s) 20. The delivery requestor device 82 may include a browser 42, which may be used to provide web-based interfaces for or with other parties in the computing environment 10. The browser 42 in this example may include a TS plug-in 85 to illustrate another way to communicate with the trusted system 12 (e.g., via the delivery interface 40 of the trusted system 12). It can be appreciated that communication with the trusted system 12 may, additionally or alternatively, be provided without the need of a TS plug-in 85 in other implementations. The delivery requestor device 82 may, additionally or alternatively, include the trusted system app 53 with the TSIM 56 to communicate with the trusted system 12 (e.g., via the delivery interface 40 of the trusted system 12), e.g., while using the trusted system app 53 to obtain the permitted portion of the address information or delivery route. The delivery requestor device 82 may include a credential module 84 which can be used to generate, store, and/or verify that the user of the delivery requestor device 82 (e.g., the delivery requestor 16) is authorized to use the credentials 30 to be provided to the trusted system 12 or may interface with a credential service 32. The delivery requestor device 82 may include a customer module 86 that may be used to provide customer profiles and/or accounts stored in a customer database 88, which functionality may be provided aside from an ability to communicate with the trusted system 12. Similarly, the delivery requestor device 82 in this example communicates with an inventory system 90 of the delivery requestor 16, e.g., a merchant inventory system that communicates with shippers and suppliers to provide merchandise through the merchant server app 83.

FIG. 7 illustrates an example of a configuration for a recipient device 92, which may be an electronic device utilized by a delivery recipient 14 such as the customer of a delivery requestor 16 (e.g., a merchant), in connection with requesting a delivery for that customer via the merchant (which may use the trusted system 12). Such electronic devices may include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a VR device, an AR device, etc. The recipient device 92 may include one or more processors 36 and/or one or more communications modules 38. While not delineated in FIG. 7, the recipient device 92 may include at least one memory or memory device that may include a tangible and non-transitory computer-readable medium having stored therein computer programs, sets of instructions to be executed by processor(s) 36. The processor(s) 36 and communication module(s) 38 may be connected to each other via a data bus or other backbone to enable components of the recipient device 92 to operate together as described herein. FIG. 7 illustrates examples of modules and applications stored in memory on the recipient device 92 and operated by the processor(s) 36. It can be appreciated that any of the modules and applications shown in FIG. 7 may, additionally or alternatively, be hosted externally and be made available to the recipient device 92, e.g., via a communications module 38 of the recipient device 92.

The recipient device 92 in this example provides a merchant app 96 that permits the recipient device 92 to communicate with a delivery requestor 16 via the merchant server app 93 of the delivery requestor device 82 (see FIG. 6—described above). The recipient device 92 may include a carrier interface 44 to enable the recipient device 92 to interact with device(s) 76 used by the carrier(s) 20, e.g., to receive shipping updates, delivery notices, changes, etc. The recipient device 92 may include a browser 42, which can be used in this example to provide web-based interfaces for or with other parties in the computing environment 10. The recipient device 92 may, additionally or alternatively, include the trusted system app 53 with the TSIM 56 to interact with the trusted system 12 (e.g., via the customer interface 46) to obtain a permitted portion of the address information or delivery route. The trusted system app 53 used by the recipient device 92 may include the credential generator 54 to generate a credential 30 as exemplified above. The recipient device 92 may additionally include a GPS receiver 80 or other location-based device to be used if a credential 30 is or includes location-based information.

Figure 8:
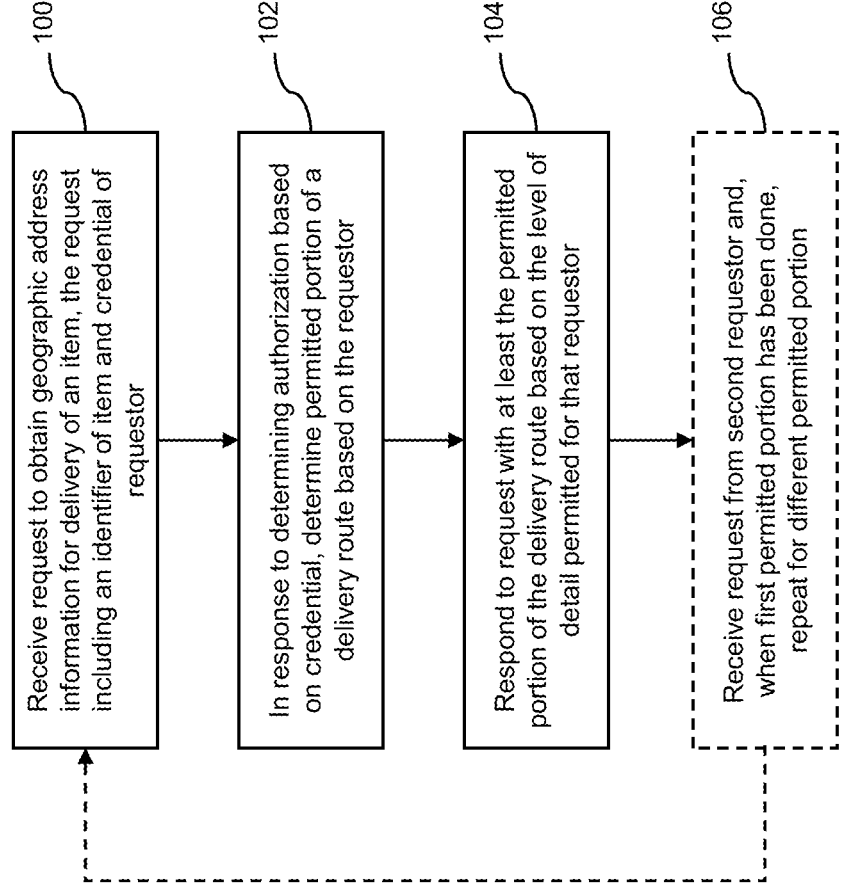
FIG. 8 is a flow chart illustrating example operations for selectively granting access to permitted portions of address information associated with a delivery route, based on credentials provided by requesting parties.

Referring now to FIG. 8, a flow chart is provided illustrating example operations that can be implemented for granting access to permitted portions 64 of address information associated with a delivery route. Access to the permitted portions 64 may be based on credentials provided by requesting parties.

At block 100, the trusted system 12 receives a request to obtain geographic address information for delivery of a package 28. The request may be received at the trusted system 12, for example, from a trusted server app 53 operated by an electronic device of the requesting party. The request may include an identifier of the package 28, such as the contents of the ID 67 that is provided on or affixed to the packaging 27. The request may include a credential 30 of the requestor and/or data derived from the credential 30 of the requestor. For example, the credential 30 and/or data derived from the credential 30 may include a location-based tag indicating the location of the requestor, a one-time code, a token generated by or previously provided to the requesting party, a cryptographically signed message (e.g. of the contents of ID 67, signed using a credential 30 possessed by the requestor, such as a private key), and/or other data that enables the trusted system 12 to verify that the requestor knows and/or possesses the credential 30.

At block 102, when the requestor's knowledge and/or possession of the credential 30 is determined (e.g., by comparing the credential to something stored by the trusted system 12, or decrypting or performing a cryptographic verification, etc.) and it is further determined that the credential 30 is associated with an authorization to receive a permitted portion of the delivery route, the trusted system 12 may determine the permitted portion of a delivery route. The trusted system 12 may determine the permitted portion of the delivery route based on the current location of the package 28. Additionally or alternatively, the trusted system 12 may determine the permitted portion of the delivery route based on a list of destinations between the shipping originator 18 and the recipient. Additionally or alternatively, the trusted system 12 may determine the permitted portion of the delivery route based on the current location of package 28 and/or a nearest sorting or distribution center. Additionally or alternatively, the trusted system 12 may determine the permitted portion of the delivery route based on the minimum amount of information required for a carrier 20 to transport the package 28 to the nearest sorting or distribution center. Additionally or alternatively, the trusted system 12 may determine the permitted portion of by analyzing the address entry 62 (i.e. of the ultimate destination) from the address database 26 and/or determining a subset of the address entry 62 (e.g. the minimum amount of information required for a carrier 20 to determine where to transport the package 28). The permitted portion 64 may be generated (or re-generated) in real-time (e.g., as a carrier 20 gets closer to a destination) and/or may be determined in advance.

At block 104, the trusted system 12 responds to the request (e.g., via the trusted system app 53), with at least the permitted portion 64 of the delivery route based on the requestor, e.g., based on the level of detail permitted for that requestor.

For delivery routes having more than one leg, at block 106, a request may be received from at least one second requestor and the method may be repeated for a different permitted portion 64, e.g., one with different or additional detail to permit the next leg of the delivery route. As indicated in FIG. 8, block 106 may require that the first permitted portion (associated with the prior request) be confirmed as completed before processing the second request. In some embodiments, the confirmation may be determined from the second requestor having submitted the contents of ID 67 with the second request.

In this way, the permitted portions 64 of the delivery route may be selectively distributed to the appropriate parties only when needed. Conveniently, in this way, the amount of time any given party has access to their permitted portion 64 may be reduced or minimized.

Figure 9:
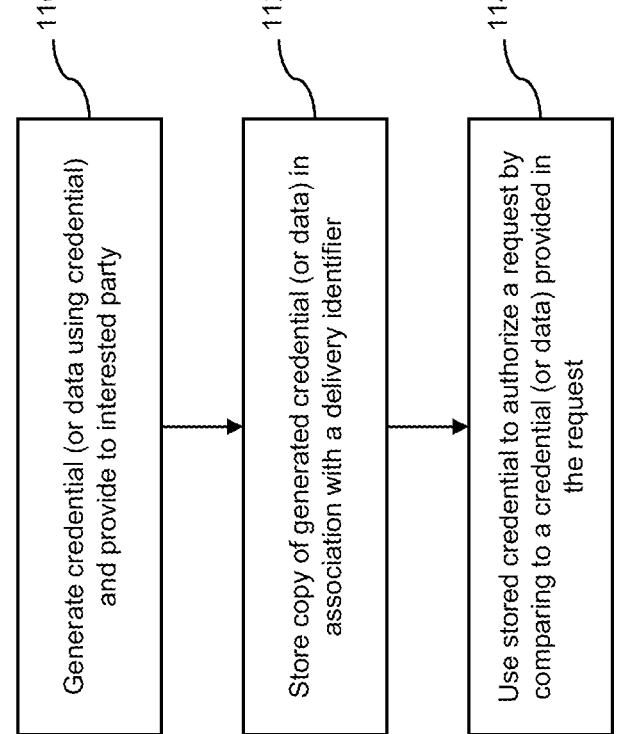
FIG. 9 is a flow chart illustrating example operations for generating, providing, and storing credentials to determine that a party is authorized to obtain permitted portions of the address information associated with the delivery route.

FIG. 9 provides a flow chart illustrating example operations that may be implemented for the purpose of generating and utilizing credentials 30 using, e.g., the trusted system 12. For example, the operations shown in FIG. 9 may be performed by the trusted system 12 in embodiments where the trusted system 12 generates credentials 30 and/or data based on the credentials 30, and distributes that credential 30 or data to the respective devices of the interested parties in the computing environment 10.

At block 110, the trusted system 12 generates a credential 30 and/or data based on the credential 30 and provides the credential 30 and/or the data based on the credential 30 to the respective device used by the interested party. For example, block 110 may be performed at the time of determining a delivery route or in real-time as the interested parties become involved in the delivery process.

At block 112, the trusted system 12 stores a copy of the credential 30 and/or the data generated based on the credential 30 in association with a delivery identifier. For example, when a private delivery process is initiated, a tracking number or confirmation number may be generated by the delivery requestor 16 (e.g., merchant) or the shipping originator 18, which can be used to track which credentials 30 should be associated with that shipment. The contents of an ID 67 on a package 28 may include and/or be based on the delivery identifier. At the same time, the delivery route (and/or portions thereof) may be generated and associated with the delivery identifier and the credential 30 (or multiple credentials 30) required to satisfy requests by, e.g., the carriers carrying out different portions of the delivery route.

At block 114, the trusted system 12 may use the stored credential 30 and/or data generated based on the credential 30 to determine that a request (e.g., by a carrier 20) is authorized by comparing the stored credential 30 and/or data generated based on the credential 30 to data provided in the request. It can be appreciated that the comparison may represent the application of a function or process required to perform the authentication, e.g., by cryptographically processing the request, converting a token to a readable message, etc.

Figure 10:
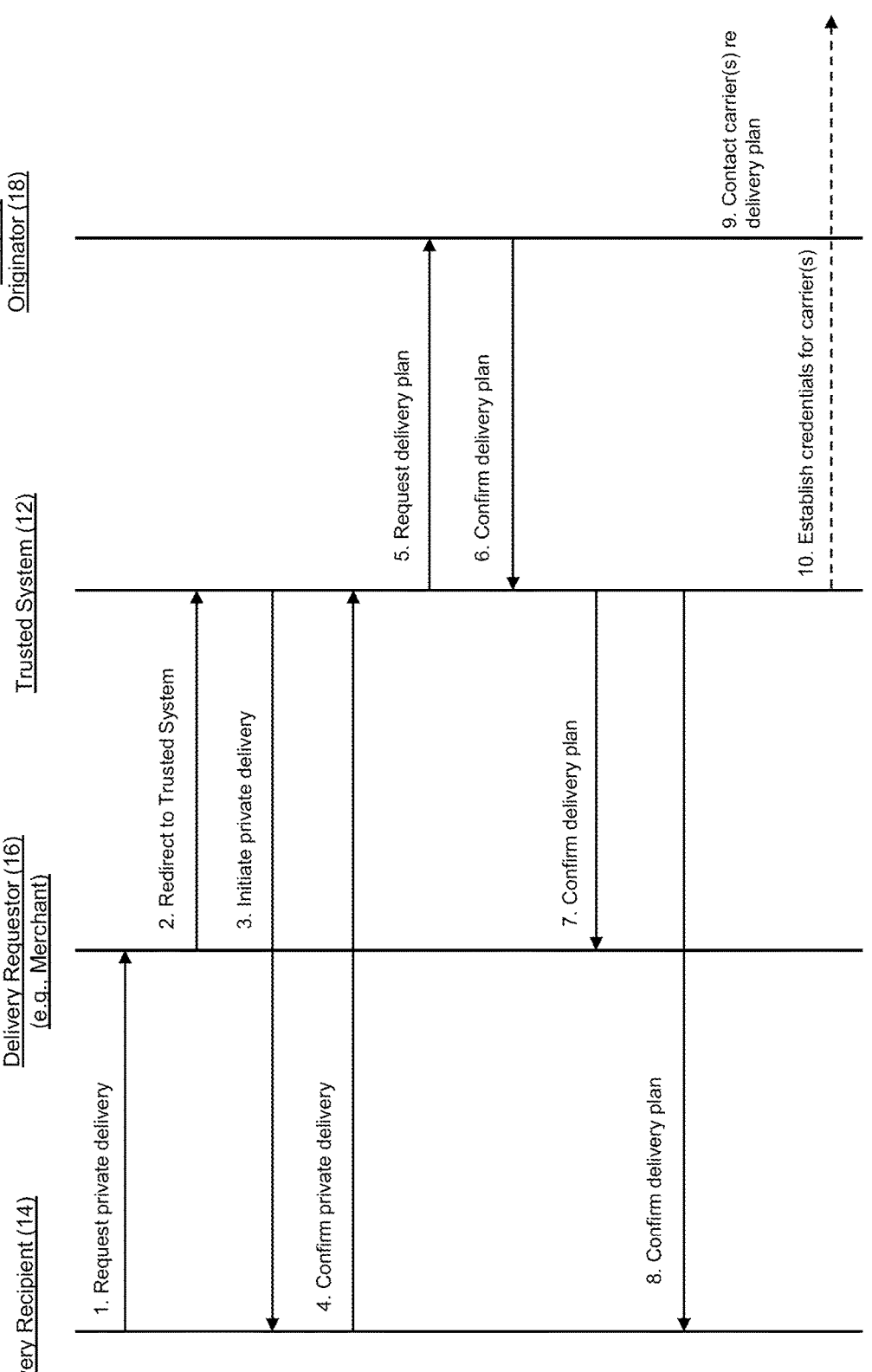
FIG. 10 is a sequence diagram illustrating an example of a process for initiating a private shipping process.

Referring now to FIG. 10, a sequence diagram is shown for initiating a private delivery process via the trusted system 12.

At step 1, the delivery recipient 14 requests a private delivery process with a delivery requestor 16 (e.g., a merchant), e.g., during a checkout process.

At step 2, the delivery recipient 14 and/or the delivery requestor 16 communicate the private delivery process request (or a request based on the private delivery request) to the trusted system 12.

The trusted system 12 initiates a private delivery process at step 3 with the delivery recipient 14, e.g., by obtaining the full address information and having the delivery recipient 14 agree to any terms and conditions.

At step 4, the delivery recipient 14 may optionally confirm the initiation of the private delivery process to the trusted system 12. Additionally or alternatively, the trusted system 12 may await other confirmations. When the trusted system 12 is not or is no longer awaiting such confirmations (and/or while awaiting such confirmations), the trusted system 12 may determine the delivery route (or portions thereof). In other embodiments, the trusted system 12 may, additionally or alternatively, request delivery route data from one or more other systems (e.g., those of potential shipping originators, potential carriers, data aggregators) and determine the delivery route (or portions thereof) based on the delivery route data. For example, the trusted system 12 may confirm with a potential shipping originator 18 whether the delivery can originate from the potential shipping originator 18 before determining the delivery route (or portions thereof).

In other embodiments, the trusted system 12 may, additionally or alternatively, request a complete delivery route (or portions thereof) from one or more other systems. At step 5, for example, the trusted system 12 may request a delivery route from the shipping originator 18. The request may be performed such that, for example, the shipping originator 18 is not given a complete address but is given enough to determine which carrier 20 they wish to use (e.g., on a regional basis).

The shipping originator 18 may confirm the delivery route (or portions thereof, as specifically made available to the shipping originator 18 by the trusted system 12) at step 6.

The trusted system 12 may confirm the delivery route (or portions thereof) with the delivery requestor 16 (e.g., the merchant) at step 7, e.g., by providing a shipping confirmation and/or tracking number.

The trusted system 12 may confirm the delivery plan with the delivery recipient 14 at step 8, e.g., by providing a shipping confirmation and/or tracking number.

At step 9, the shipping originator 18 may contact the carrier(s) 20 that are to be used, however, this step may also or instead be performed by the trusted system 12. For example, if the trusted system 12 determined the delivery plan (e.g., instead of requesting it from the shipping originator 18), it may also contact the carrier(s) 20. In some embodiments, the trusted system only contacts a subset of the carrier(s) 20 (e.g., those required to complete the next one or more portion(s) or leg(s) of the delivery route).

At step 10, the trusted system 12 establishes credentials 30 for the carrier(s) 20 if they are known at that time. The trusted system 12 may also establish credentials 30 for any other interested parties (e.g., the shipping originator 18, the delivery requestor 16, the delivery recipient 14, etc.). This may include generating credentials 30 at the trusted system 12 and/or using the credential service 32.

Subsequent to step 10, a series of one or more delivery route portions may be performed by the carriers 20 in communication with the trusted system 12. At each portion or leg of the delivery route, scan, request, and response operations may be performed to determine that the respective carrier 20 is authorized to access respective permitted portions 64 of the delivery route and thus to release the respective permitted portions 64 to enable the respective carriers 20 to perform the next portion or leg of the delivery route.

Figure 11A:
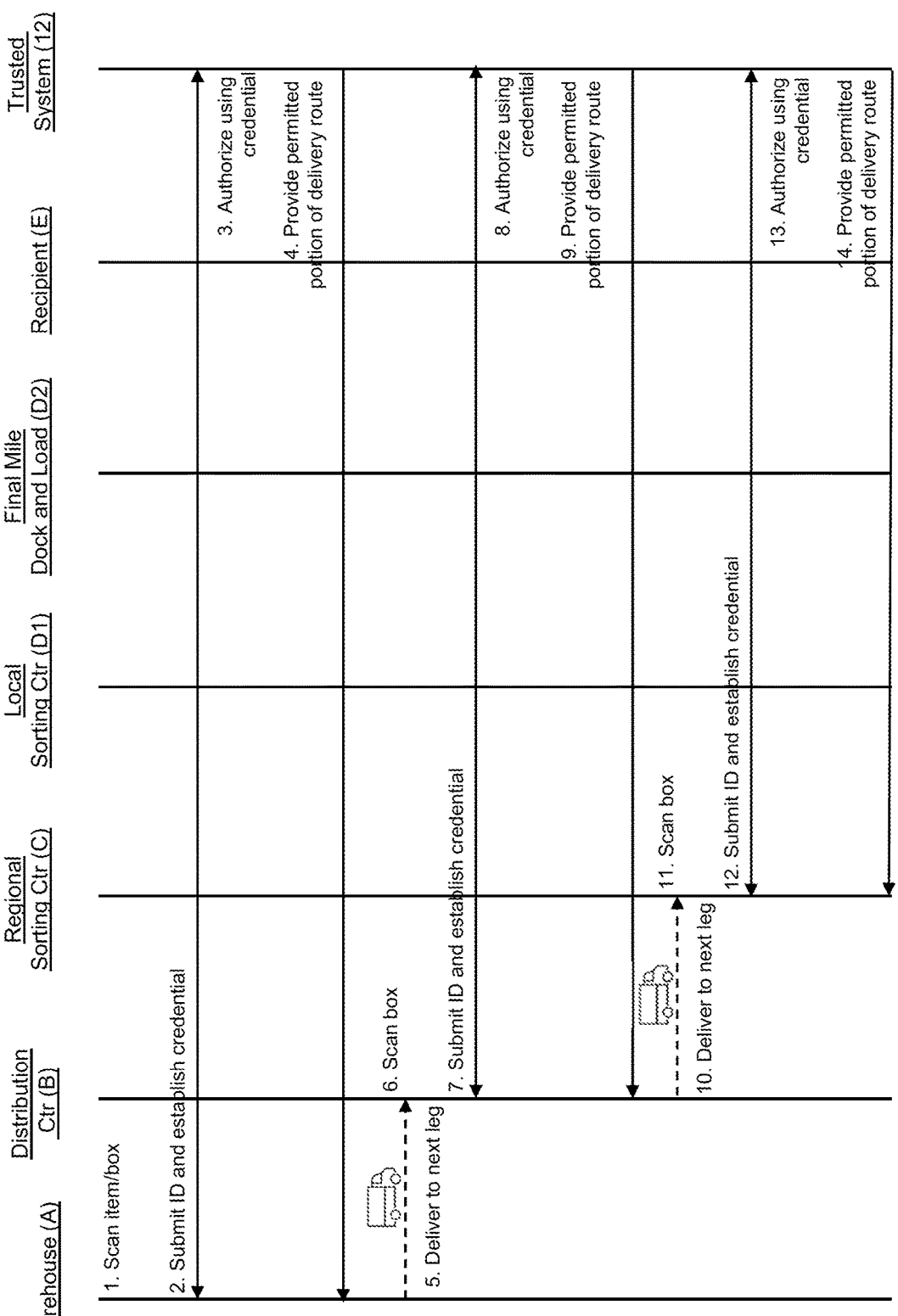
FIGS. 11*a* and 11*b* are a sequence diagram illustrating an example of a private shipping process executed for an illustrative delivery route.
Figure 11B:
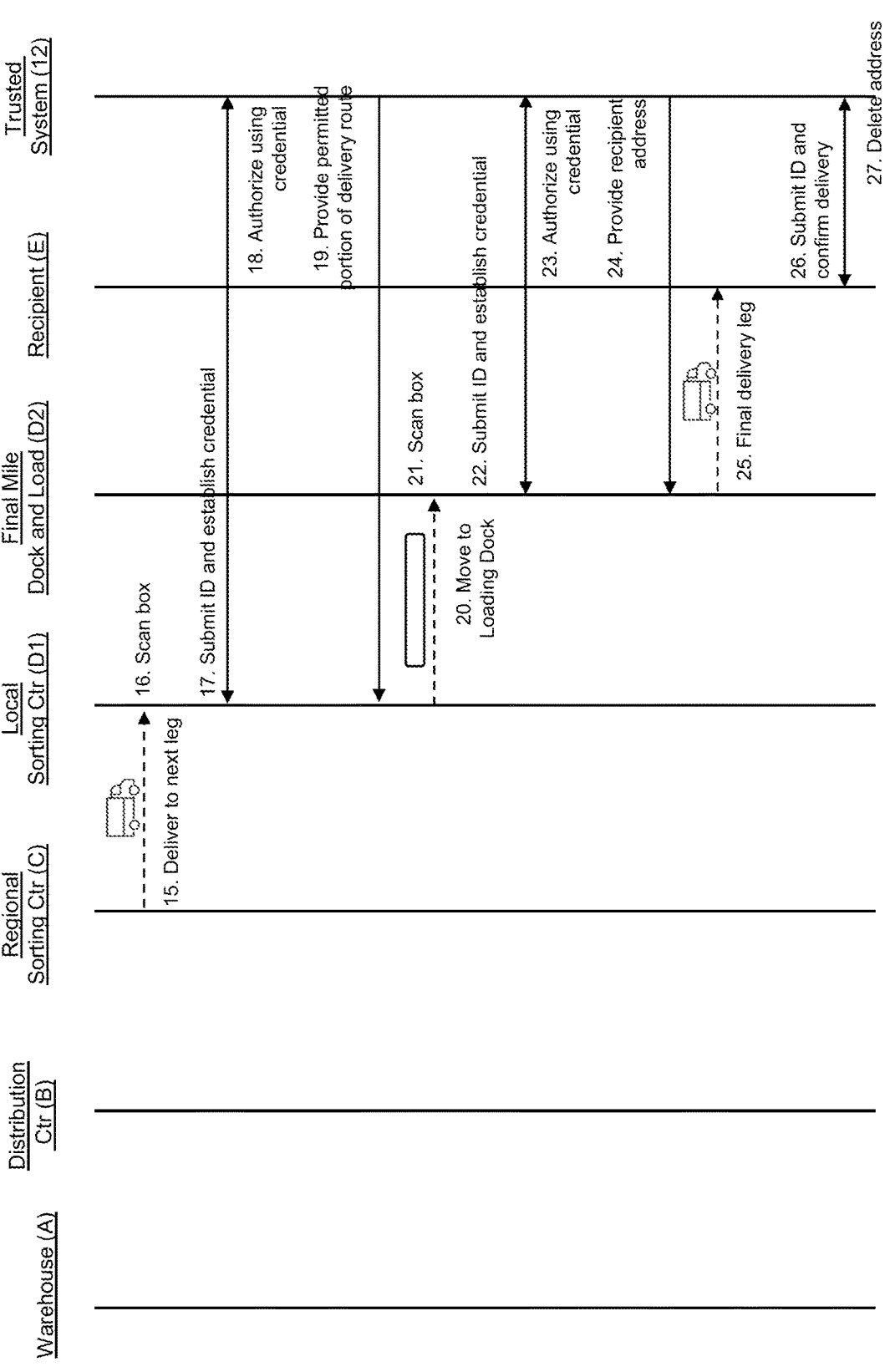

FIGS. 11*a* and 11*b* provide a sequence diagram for an example private delivery process for, e.g., a package 28. The delivery route of the private delivery process illustrated in FIGS. 11*a* and 11*b* may be generated or received by the trusted system 12. The delivery route illustrated in FIGS. 11*a*-11*b* includes the following hops:

1. Manufacturer warehouse—Location A
    2. Distribution center—Location B
    3. Regional sorting center—Location C
    4. Local sorting center—Location D1

5. Final mile dock and load—Location D2

6. Recipient delivery address—Location E

This delivery route may be determined when the package 28 is still at Location A. In other embodiments, the delivery route (or portions thereof) may, additionally or alternatively, be determined and/or re-determined after the package 28 has departed Location A. For example, the trusted system 12 may only determine the next portion or hop of the delivery route upon the package 28 completing the current portion hop, and/or when such completion is expected to occur within a threshold amount of time.

In some embodiments, movement of the package 28 along the delivery route or portions thereof may be driven by the trusted system 12. For example, the first portion of the delivery route may be caused by the trusted system 12 directing a carrier 20 to scan the package 28 at Location A (e.g., to receive instructions about delivering the package 28 to Location B) and directing a different carrier 20 to scan the package 28 at Location B at a later time. The trusted system 12 may determine which carrier(s) 20 to use based on a selection of next hop location(s), it may determine next hop location(s) based on a selection of carrier(s), and/or it may determine selections of both next hop locations(s) and carrier(s) simultaneously.

In other embodiments, movement of the package 28 along the delivery route (or portions thereof) may be, alternatively, driven by the carrier(s) 20. For example, in the delivery route illustrated in FIGS. 11a-11b, the carrier(s) 20 cause movement of the package 28 by making requests to the trusted system 12 (i.e., in response to the presence of package 28 and/or through the routine processing of packages). The trusted system 12, in turn, may respond to requests and/or data from the carriers(s) 20 by providing the respective permitted portions 64 of the delivery route to the respective carrier(s) 20. The trusted system 12 may, additionally or alternatively, generate options for the carrier(s) 20 for, e.g., the next hop, allowing the carrier(s) 20 greater control over one or more portions of the delivery route.

In yet other embodiments, the trusted system 12 and the carrier(s) 20 may each cause movement of the package 28 along different portions of the delivery route. For example, a carrier 20 may cause the package 28 to be moved along the first portion or leg of the delivery route, and the trusted system 12 may cause the package 28 to be moved along the remaining portions or legs of the delivery route.

At step 1, in this example, the item 25 and/or the packaging 27 of the package 28 are scanned, the contents of ID 67 are submitted to the trusted system 12, and the credential 30 is established at step 2 (e.g., may be returned by the trusted system 12). The trusted system 12 may then determine whether a carrier device 76 used by a carrier 20 is authorized using the credential 30 at step 3 and provide the permitted portion 64 of the delivery route to the carrier device 76 at step 4. This enables the carrier 20 to deliver the package 28 from Location A to the next destination, namely the distribution center (Location B) at step 5. To the extent that the first leg carrier 20 is also the party that assembled item 25 into the package 28, this carrier 20 may be considered to be the shipping originator 18. In some embodiments, the shipping originator 18 and the first leg carrier 20 may be different parties, and the shipping originator 18 may not itself be able to deliver the package 28 from Location A to Location B.

The trusted system 12 may send only as much address information that is needed by the first leg carrier 20 to determine Location B. For example, the carrier 20 may indicate that it needs to know the country in which the package will be delivered, but that it is otherwise able to determine, from the country the appropriate distribution center at Location B. The trusted system 12 may return this information (i.e., responsive to the indication). The trusted system 12 may provide a token or credential 30 to the carrier 20 to be forwarded to the distribution center at Location B and/or to the next carrier 20. Alternatively or additionally, the trusted system 12 may provide this token or other credential 30 directly to the distribution center at Location B and/or to the next carrier 20.

For steps 6-9, at the distribution center at Location B, the package 28 would be offloaded and the next carrier 20 (at Location B) would require information to determine the next portion or hop of the delivery route. For example, the next carrier 20 may scan (step 6) the package 28, which may then initiate an exchange with the trusted system 12 (step 7).

The next carrier 20 may provide the contents of the ID 67 and its token or other credential 30 to the trusted system 12 at step 7 to get the next permitted portion of the delivery route. Optionally, the trusted system 12 may require that the next carrier 20 also provide an identifier or some piece of location information that confirms the originating location, namely Location A as part of, e.g., confirmation that the first hop of the delivery route was completed successfully. At that time, the token or other credential 30 issued for the portion or hop from Location A to Location B may be expired or destroyed to ensure that any address information required by the respective carrier 20 is no longer available.

The trusted system 12 may process the request of the next carrier 20 at step 8. For example, the trusted system 12 may verify the next carrier 20's possession of the credential 30.

The trusted system 12 may return the level of address detail required for the next permitted portion of the delivery route at step 9. The trusted system 12 may return the next permitted portion of the delivery route responsive to verifying that the next carrier 20 possesses the credential 30. The level of address detail required in the next permitted portion may be known in advance or may be indicated in the request sent by the next carrier 20, e.g., to determine the appropriate regional sorting center at Location C (implying the next carrier 20's knowledge of the addresses of one or more regional sorting centers).

At step 10, the package 28 is delivered to the next destination, namely to the regional sorting center at Location C, by the next carrier 20.

For steps 11-14, the hop from Location C to Location D may be implemented in the same manner as the two previous hops with progressively more specificity provided in the address to go from region (e.g., province/state or area of province/state) to city for local sorting. That is, this hop is provided in this example scenario to further illustrate the potential complexity of the delivery route.

Referring now to FIG. 11b after delivery at step 15 to the local sorting center, steps 16-19 are performed. This hop illustrates how the trusted system 12 may be used to isolate address information within the same location. Here, the carrier 20 at the local sorting center at Location D1 may only need to determine which loading dock to direct the package 28 to, based on the city or street in the city, i.e., to determine which truck will be used for the last mile.

The package 28 may then be redirected to the appropriate loading dock in Location D2 (at step 20) without the carrier 20 at the local sorting center knowing as much information as the loading dock.

For steps 21-24, this hop corresponds to the last mile in this example. The trusted system 12 may require additional or enhanced security for this portion or leg of the delivery route since the exact address would be needed by this carrier 20. For example, the trusted system 12 may require a one-time token provided to the last mile carrier when they have been selected, and/or a digital certificate and/or another longer lasting credential 30. The trusted system 12 may, additionally or alternatively, require a request from the last mile carrier 20 to contain the appropriate contents of the ID 67 (scanned at step 21) that identifies the package 28 (or data based on the contents of ID 67).

The trusted system 12 may then return the exact delivery address to the last mile carrier 20 (at step 24).

The package 28 may be identified (e.g., by scanning the ID 67 on the package 28) at the door when it is unloaded and left behind after the final delivery leg is performed at step 25. Whether a signature is required upon delivery or a drop off is permitted, the trusted system 12 may require that the last mile carrier 20 confirm delivery by confirming the address (which may be provided, e.g., automatically by a navigation system, GPS, or other system) to ensure that the package 28 has been delivered to the correct address. If not, an alert, error code, or notification may be generated so that the carrier 20 may rectify the situation, e.g., if the incorrect box was grabbed from the truck, even though they arrived at the correct address.

Alternatively or additionally, the trusted system 12 may require the delivery recipient 14 (e.g., the buyer) to confirm delivery at step 26 by submitting the contents of ID 67, e.g., by confirming in an app or by replying to an email or push notification.

At step 27, the trusted system 12 may delete the address entry 62 from the address database 26 and, e.g., any segment information by, e.g., expiring the information and/or revoking any credentials 30 (or data generated based on the credentials 30) so that the respective carriers 20 can no longer access that information, or request it again in a fraudulent or unnecessary manner. In some embodiments, the trusted system 12 may provide (or otherwise continue to provide), to the shipping originator 18, the delivery requestor 16, and/or other interested parties, access to the information or some subset thereof for, e.g., record keeping purposes (e.g., the delivery address 62, if and when delivery was successful, and/or where the last hop was completed). Such access may be based on separate credentials, may expire after some duration, and/or may change based on the last completed hop.

Figures 12, 13:
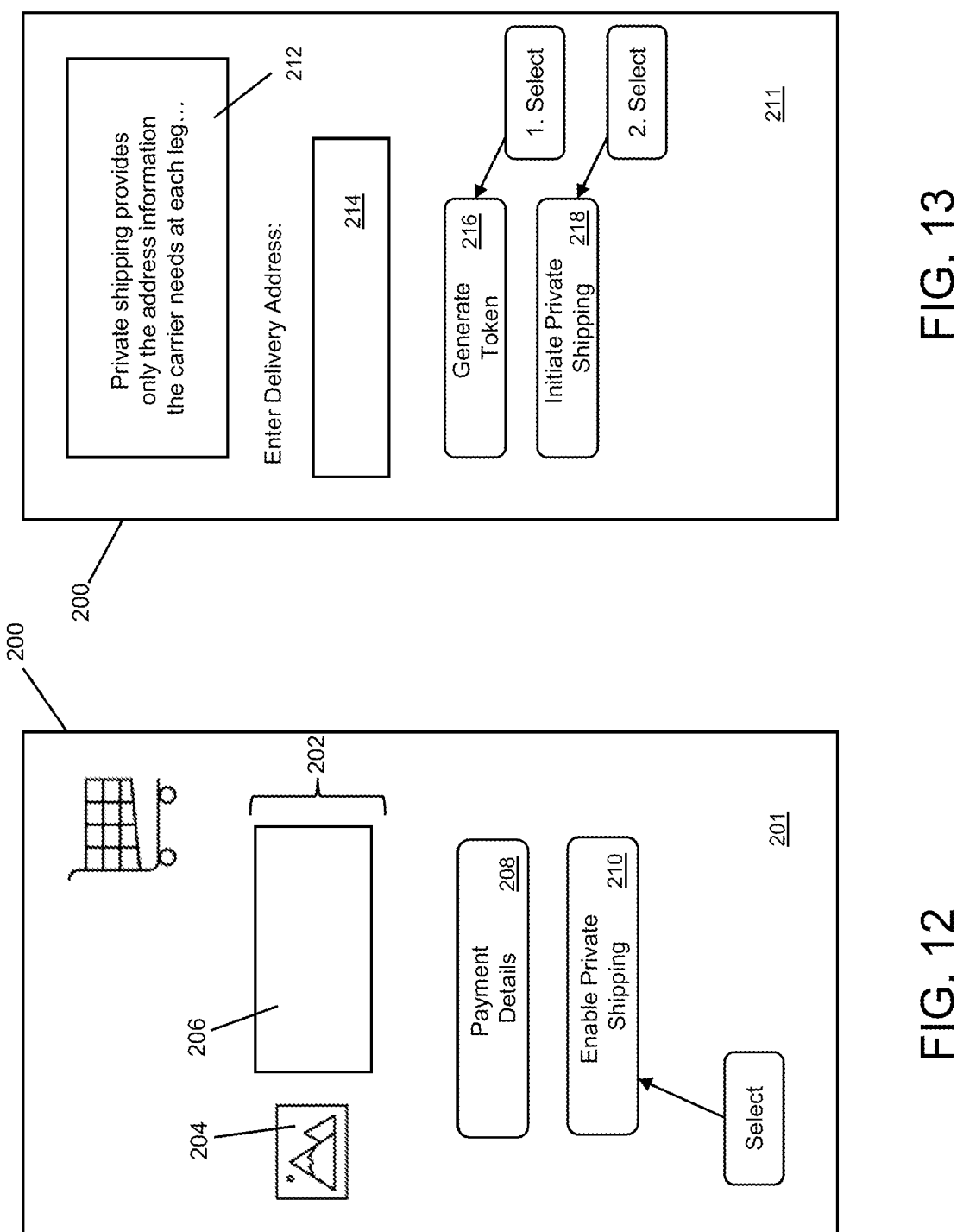
FIG. 12 shows an example merchant application user interface (UI) having an option to enable a customer to select private shipping.
FIG. 13 shows an example trusted system UI used by a customer for initiating the private shipping process via the trusted system.

Referring now to FIG. 12, an e-commerce checkout UI 201 displayed on an electronic display screen 200 is shown. The UI 201 may include an item 202 to be purchased, with a photo 204 and item description 206 shown by way of example. The UI 201 may also include a Payment Details option 208, which can be selected to enter payment information. Also shown in FIG. 12 is an Enable Private Shipping option 210, which can be selected to initiate a private delivery process with the trusted system 12 in order to have address information associated with the shipment be released only as needed, as described above. By selecting the option 210 as shown in FIG. 12, a trusted system UI 211 may be displayed as shown in FIG. 13.

In FIG. 13, a trusted system UI 211 displayed on an electronic display screen 200 is shown. In this example, the UI 211 may include a message box 212, which explains that: "Private shipping provides only the address information the carrier needs at each leg . . . ". The message box 212 can also provide additional details, for example, that the actual address need not be printed on the packaging 27, since the UID 27 may bind the address to the item 25 and may require the trusted system 12 to selectively release permitted portions 64 of the address 62. To use the trusted system 12, the user may enter the delivery address in entry box 214. This information may be securely stored as described above once the private shipping process is initiated. The UI 211 provides a Generate Token option 216, which may be first selected to enable the user to generate a token or other credential 30. It can be appreciated that selecting option 216 may cause the recipient device 92 or trusted system 12 to generate the credential 30, which may involve the entry of additional information to provide further security, for example, identifying information of the item 25, the merchant, etc. The UI 211 also provides an Initiate Private Shipping option 218, which may then be selected to initiate a private delivery process with the trusted system 12.

Figures 14, 15:
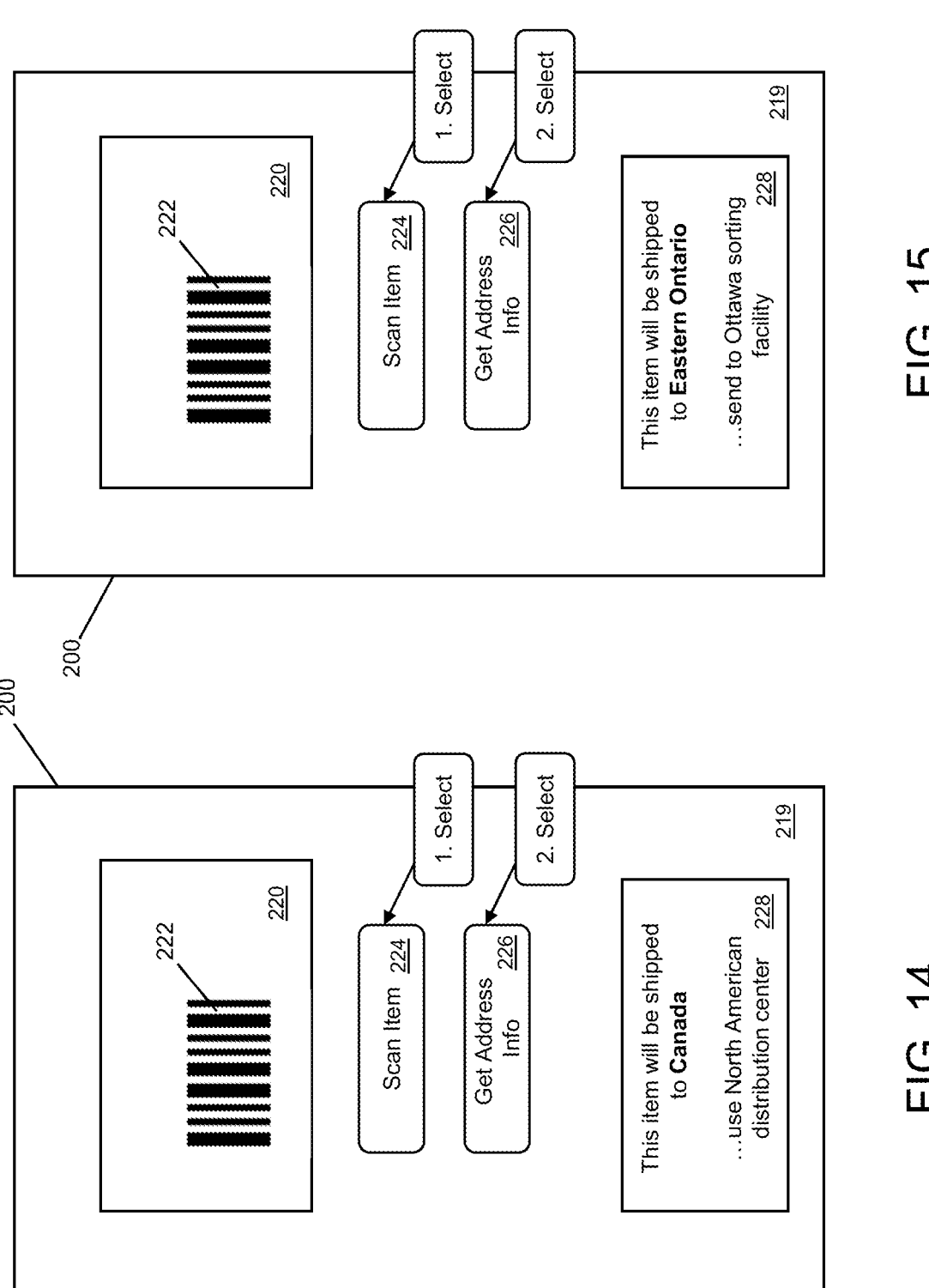
FIG. 14 shows an example trusted system UI used by a shipping originator for scanning items and requesting permitted address information for a first leg in a private shipping process.
FIG. 15 shows an example trusted system UI used by a mid-mile carrier for scanning items and requesting permitted address information for a mid-leg in the private shipping process.

Referring to FIG. 14, an example trusted system UI 219 as seen by a shipping originator 18 is shown. In this example, the UI 219 may include a scanning window 220, with a visible barcode 222 seen in the window for illustrative purposes. A Scan Item option 224 may be first selected to have the scanning window 220 activated to locate a barcode 222 for reading. Once scanned, the user may select a Get Address Info option 226 to obtain the permitted portion 64 of the address information that the shipping originator 18 is authorized to have. A response box 228 may be provided as shown, to return the requested delivery route information. In this example, the shipping originator 18 is also a carrier 20, and the response box 228 indicates that the item will be shipped to Canada and suggests using the North American distribution center. Providing a suggested distribution center may be implemented by integrating shipping information with the interested party's app and UI 219, in order to augment the returned permitted portion "Canada" with contextually relevant data such as available distribution centers in their shipping network.

FIG. 15 illustrates the trusted system UI 219 as seen by a carrier device 76 for a mid-mile carrier 20. In this example, the same UI elements 220, 222, 224, 226 and 228 are provided, with different address information being returned in the response box 228. In this example, the permitted portion 64 of address information may include "Eastern Ontario", and a reference to a sorting facility in Ottawa. Additionally or alternatively, the permitted portion 64 of address information may include more detailed information, such as a street address (e.g. of the referenced sorting facility). Additionally or alternatively, the permitted portion 64 may include information about more than one possible destination, allowing the mid-mile carrier 20 to select between them. Conveniently, this may allow the mid-mile carrier 20 to adjust its portion of the delivery route, e.g., in response to adverse events. It can be seen that the address information provided to the mid-mile carrier 20 is different from that provided to the shipping originator 18 (acting also as a first-mile carrier 20) and may be considered more specific or as having further specificity.

In this way, the shipping originator 18 (who, as a first mile carrier 20, completed the first leg of the delivery route in this example) does not need to even know the area within the country Canada that the package 28 is to be sent since its first leg of the journey would only be to a regional (continental) distribution center. Likewise, the mid-mile carrier 20 in this example would only need to know that the package 28 is meant to arrive at an Ottawa sorting facility (i.e., in Eastern Ontario), without further details as to the final intended destination of the package 28.

Figures 16, 17:
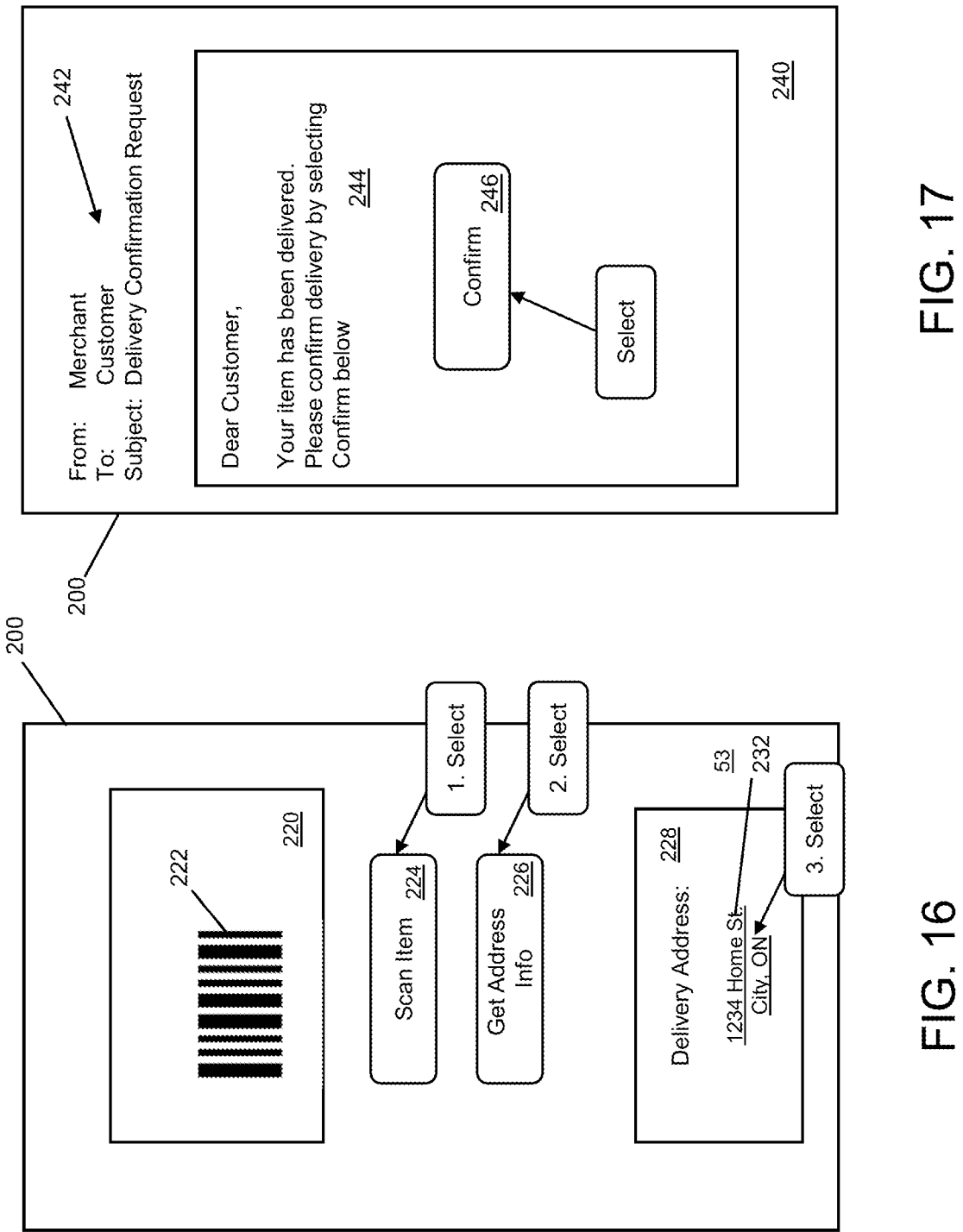
FIG. 16 shows an example trusted system UI used by a last mile carrier for scanning items and requesting the recipient delivery address in the private shipping process.
FIG. 17 shows an example message UI used by the recipient to confirm a completed delivery to terminate the private shipping process for that item.

FIG. 16 illustrates the trusted system UI 219 as seen by a carrier device 76 for a last mile carrier 20. In this example, the same UI elements 220, 222, 224, 226 and 228 are provided, with different address information being returned in the response box 228. In this example, the permitted portion 64 of address information may include the exact delivery address, which would be required for a last mile leg, namely the final portion or leg of the delivery route. The displayed address 232 may be hyperlinked to provide direct access to a map application or navigation system.

FIG. 17 illustrates an email UI 240 as seen by the customer, e.g., via the recipient device 92 or another personal computing device used by the customer. In this example, the email header 242 indicates that the message has been sent by the Merchant to the Customer regarding a Delivery Confirmation Request. This step may be provided to confirm the success of the private delivery process, e.g., by having the recipient 14 confirm that they received the package 28. Additionally or alternatively, this step may be provided to confirm that the address information 62 stored by the trusted system 12 may be deleted or otherwise made unavailable to one or more of the interested parties going forward.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method comprising:

generating, at a trusted computer system, a credential associated with a first requestor, the credential authorizing the first requestor to obtain a first permitted portion of a delivery route for an item;

associating, at the trusted computer system, the credential with an identifier of the item and protecting, by the trusted computer system, at least the first permitted portion of the delivery route using the identifier and the credential;

having, by the trusted computer system, the credential associated with the first requestor be provided to the first requestor;

receiving, at the trusted computer system, a first request to obtain geographic address information for a delivery of the item, the first request comprising the identifier of the item and the credential associated with the first requestor;

responsive to authorizing the first request based on possession of the credential and the identifier, determining, by the trusted computer system, the first permitted portion of the delivery route based on authorization given to the first requestor by provision of the credential; and responding to the first request, by the trusted computer system, by providing at least the first permitted portion of the delivery route to the first requestor.

2. The method of claim 1, further comprising:

generating, at the trusted computer system, a second credential associated with a second requestor, the second credential authorizing the second requestor to obtain a second permitted portion of the delivery route for the item, the second permitted portion being different than the first permitted portion;

associating, at the trusted computer system, the second credential with the identifier of the item and protecting, by the trusted computer system, at least the second permitted portion of the delivery route using the identifier and the second credential;

having, by the trusted computer system, the second credential associated with the second requestor be provided to the second requestor:

receiving, at the trusted computer system, a second request to obtain geographic address information for the delivery of the item, the second request comprising the identifier of the item and the second credential associated with the second requestor;

responsive to authorizing the second request based on possession of the second credential, determining, by the trusted computer system, the second permitted portion of the delivery route based on authorization given to the second requestor by provision of the second credential; and responding to the second request, by the trusted computer system, by providing at least the second permitted portion of the delivery route to the second requestor.

3. The method of claim 2, further comprising:

confirming that the first permitted portion of the delivery route has been completed prior to providing the second permitted portion of the delivery route.

4. The method of claim 1, wherein the delivery route comprises a plurality of elements and the first permitted portion comprises a subset of the plurality of elements that the first requestor is authorized to access.

5. The method of claim 4, wherein the subset of the plurality of elements comprises enough address information to complete a next portion of the delivery route.

6. The method of claim 1, wherein the credential comprises location information associated with the first requestor.

7. The method of claim 1, wherein the credential comprises a digital token, issued by the trusted computer system, to the first requestor.

8. The method of claim 7, wherein the digital token is unique to at least one of the requestor and the delivery of the item.

9. The method of claim 1, wherein the identifier of the item is provided in a barcode visible on packaging containing the item.

10. The method of claim 1, further comprising using the identifier of the item to verify that the first requestor is associated with the delivery route for the item.

11. The method of claim 1, further comprising:

storing a copy of the credential in association with an indication of the delivery route; and using the stored copy of the credential to determine that the possessor of the credential received with the first request is authorized.

12. The method of claim 1, wherein the first request and the response to the first request are exchanged via an application programming interface (API) or exchanged via a user interface (UI) portal.

13. The method of claim 1, wherein the first request and the response to the first request are exchanged in interacting with a smart contract.

14. The method of claim 1, wherein the credential of the first requestor identifies the first requestor as a last hop in the delivery route, and the permitted portion for the last hop provides a complete delivery address for a recipient of the item.

15. A trusted computer system comprising:

at least one processor;

at least one communications module to communicate with electronic devices; and at least one memory, the at least one memory comprising processor executable instructions that, when executed by the at least one processor, cause the trusted computer system to:

generate, at the trusted computer system, a credential associated with a first requestor, the credential authorizing the first requestor to obtain a first permitted portion of a delivery route for an item;

associate, at the trusted computer system, the credential with an identifier of the item and protecting, by the trusted system, at least the first permitted portion of the delivery route using the identifier and the credential;

have, by the trusted computer system, the credential associated with the first requestor be provided to the first requestor;

receive, at the trusted computer system, a first request to obtain geographic address information for a delivery of the item, the first request comprising the identifier of the item and the credential associated with the first requestor;

responsive to authorizing the first request based on possession of the credential and the identifier, determine, by the trusted computer system, the first permitted portion of the delivery route based on authorization given to the first requestor by provision of the credential; and respond to the first request, by the trusted computer system, by providing at least the first permitted portion of the delivery route to the first requestor.

16. A non-transitory computer-readable medium comprising processor executable instructions that when executed by a processor of a trusted computer system, cause the trusted computer system to:

generate, at the trusted computer system, a credential associated with a first requestor the credential authorizing the first requestor to obtain a first permitted portion of a delivery route for an item;

associate, at the trusted computer system, the credential with an identifier of the item and protecting, by the trusted computer system, at least the first permitted portion of the delivery route using the identifier and the credential;

have, by the trusted computer system, the credential associated with the first requestor be provided to the first requestor;

receive, at the trusted computer system, a first request to obtain geographic address information for a delivery of the item, the first request comprising the identifier of the item and the credential associated with the first requestor;

responsive to authorizing the first request based on possession of the credential and the identifier, determine, by the trusted computer system, the first permitted portion of the delivery route based on authorization given to the first requestor by provision of the credential; and respond to the first request, by the trusted computer system, by providing at least the first permitted portion of the delivery route to the first requestor.

17. The trusted computer system of claim 15, further comprising processor executable instructions that, when executed by the at least one processor, cause the trusted computer system to:

generate, at the trusted computer system, a second credential associated with a second requestor, the second credential authorizing the second requestor to obtain a second permitted portion of the delivery route for the item, the second permitted portion being different than the first permitted portion;

associate, at the trusted computer system, the second credential with the identifier of the item and protecting, by the trusted computer system, at least the second permitted portion of the delivery route using the identifier and the second credential;

have, by the trusted computer system, the second credential associated with the second requestor be provided to the second requestor;

receive, at the trusted computer system, a second request to obtain geographic address information for the delivery of the item, the second request comprising the identifier of the item and the second credential associated with the second requestor;

responsive to authorizing the second request based on possession of the second credential, determine, by the trusted computer system, the second permitted portion of the delivery route based on authorization given to the second requestor by provision of the credential; and respond to the second request, by the trusted computer system, by providing at least the second permitted portion of the delivery route to the second requestor.

18. The trusted computer system of claim 17, further comprising processor executable instructions that, when executed by the at least one processor, cause the trusted computer system to:

confirm that the first permitted portion of the delivery route has been completed prior to providing the second permitted portion of the delivery route.

19. The trusted computer system of claim 15, wherein the delivery route comprises a plurality of elements and the first permitted portion comprises a subset of the plurality of elements that the first requestor is authorized to access.

20. The trusted computer system of claim 15, further comprising processor executable instructions that, when executed by the at least one processor, cause the computer system to:

generate the credential;

store a copy of the credential in association with an indication of the delivery route; and use the stored copy of the credential to determine that the possessor of the credential received with the first request is authorized.

\*    \*    \*    \*    \*